(12) United States Patent
Mori et al.

(10) Patent No.: US 7,379,397 B2
(45) Date of Patent: May 27, 2008

(54) OPTICAL PICKUP AND OPTICAL DISC APPARATUS PROVIDED WITH THE SAME

(75) Inventors: Hiromitsu Mori, Tokyo (JP); Kyuichiro Nagai, Tokyo (JP); Atsushi Inoue, Tokyo (JP); Toshimasa Kamisada, Tokyo (JP); Ryuichiro Mizuno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 16 days.

(21) Appl. No.: 11/453,639

(22) Filed: Jun. 14, 2006

(65) Prior Publication Data

US 2006/0233069 A1  Oct. 19, 2006

Related U.S. Application Data

(62) Division of application No. 10/105,699, filed on Mar. 20, 2002, now Pat. No. 7,076,791.

(30) Foreign Application Priority Data

Dec. 21, 2001  (JP)  ............................. 2001-388729

(51) Int. Cl.
*G11B 7/00* (2006.01)
(52) U.S. Cl. .................................. 369/44.15; 720/683
(58) Field of Classification Search ........ 720/680–684; 369/44.14, 44.15, 44.16, 44.22; 359/813, 359/814, 823, 824
See application file for complete search history.

(56) References Cited

U.S. PATENT DOCUMENTS

| 4,462,096 A | * | 7/1984 | Kusaka | .................... | 369/44.16 |
| 5,621,576 A | * | 4/1997 | Yamauchi et al. | .......... | 359/814 |
| 7,076,791 B2 | * | 7/2006 | Mori et al. | ................ | 720/683 |

* cited by examiner

*Primary Examiner*—Angel Castro
(74) *Attorney, Agent, or Firm*—Townsend and Townsend and Crew LLP

(57) ABSTRACT

The invention provides an optical disc apparatus which restricts an operation sound generated from an objective lens driving portion of an optical pickup and has a reduce sound, in an optical disc apparatus, in particular, an optical disc apparatus installing a microphone for recording an external voice therein. Coils (107, 108), a magnet (109) and opposing surfaces of a yoke (110) are respectively arranged at substantially point symmetrical positions with respect to an optical axis (111) of an objective lens (103) in a state in which no electric current is applied, the yoke (110) and a unit base (117) are connected via a spring member (118), and the unit base (117) is mounted to a casing (120). In this case, the spring member (118) is connected at a position (121) forward apart from the objective lens (103) with respect to the yoke (110), and is formed so as to have at least a deformation freedom in a direction of the optical axis of the objective lens (103). The casing (120) is made in a closed structure surrounding a space in which the unit base (117), a lens holder (106), the yoke (110) and the magnet (109) are arranged, except a surface opposing to a disc-like recording medium (104).

4 Claims, 31 Drawing Sheets

A-A CROSS SECTION

FIG.4
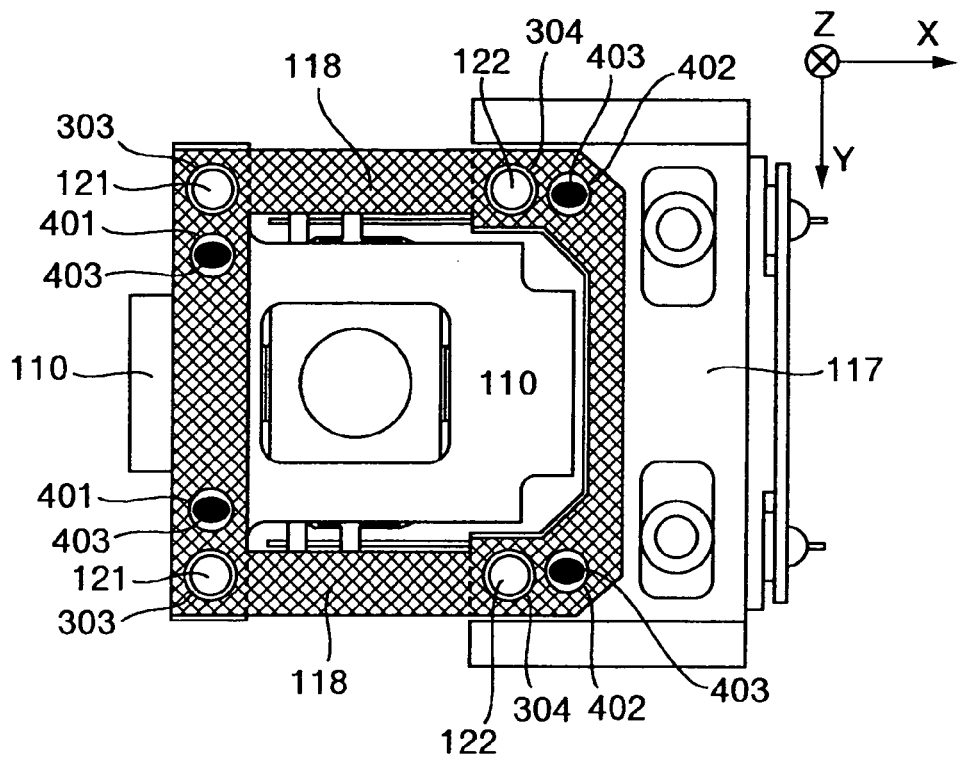
B-C CROSS SECTION
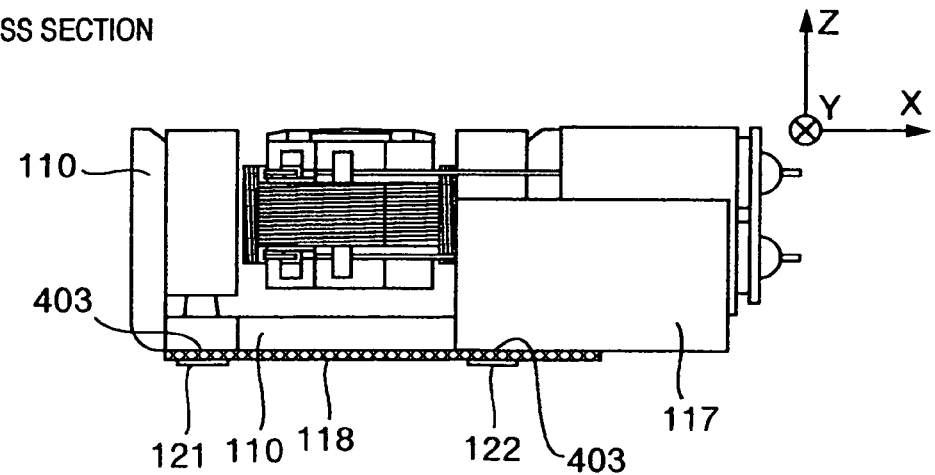

FIG.6
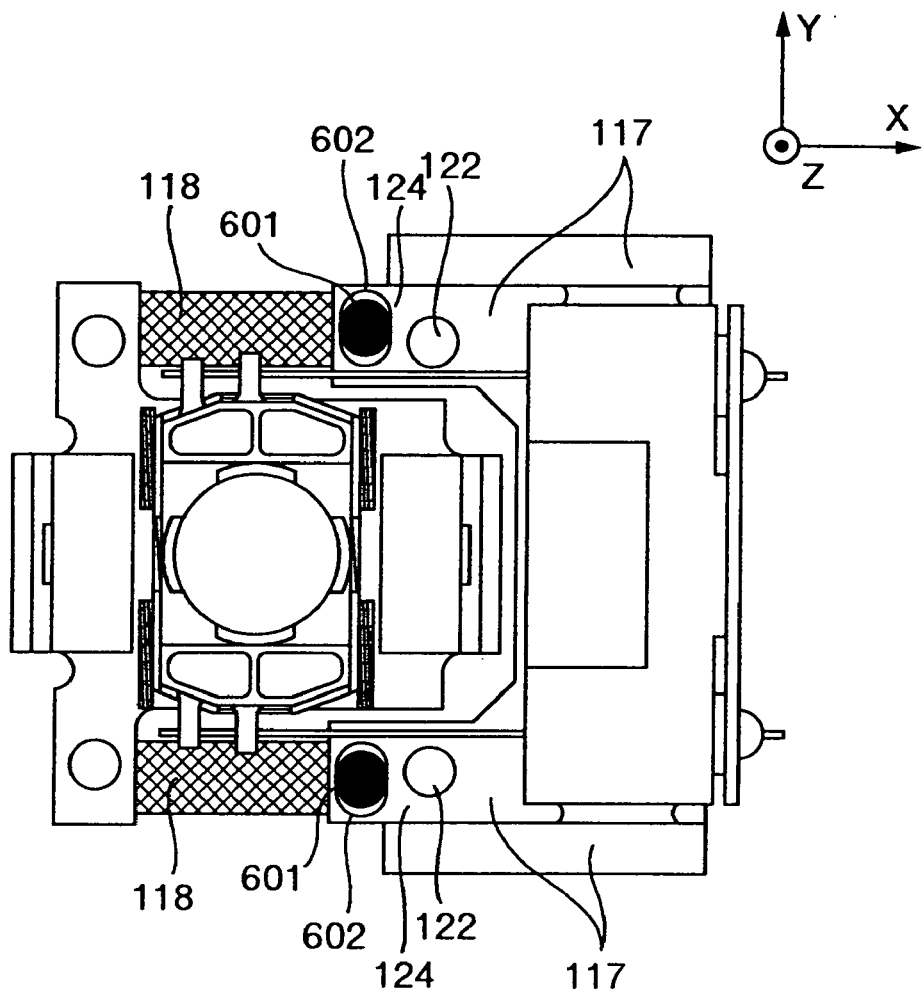
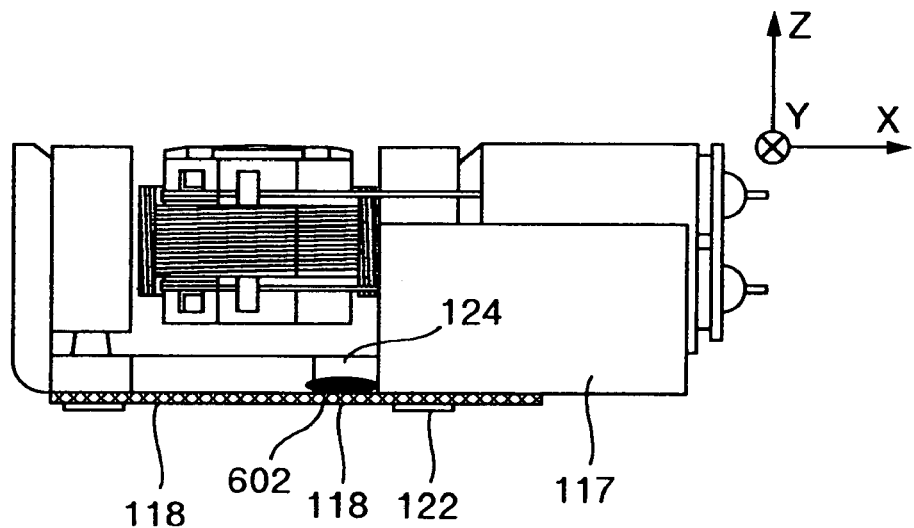

FIG.7
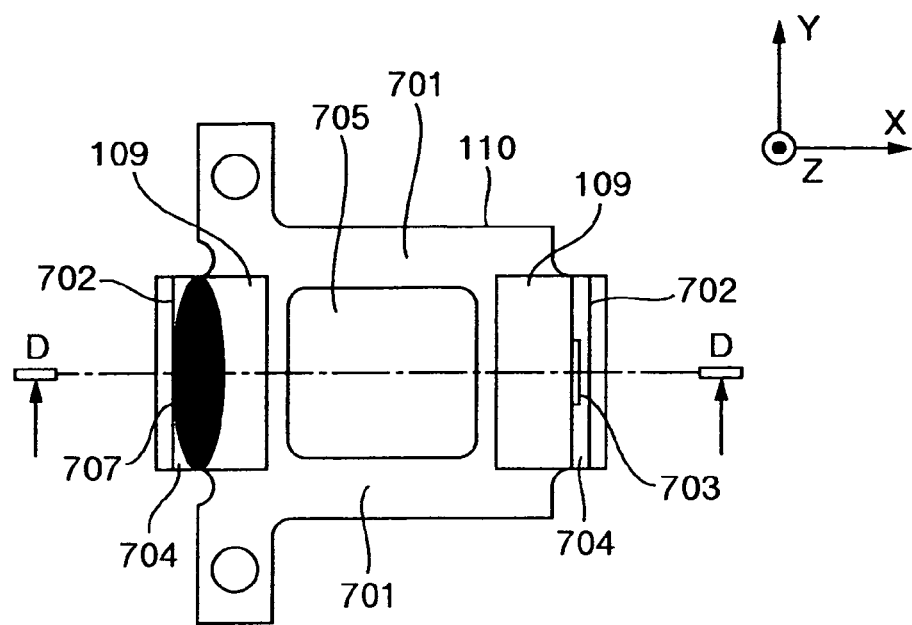
D-D CROSS SECTION
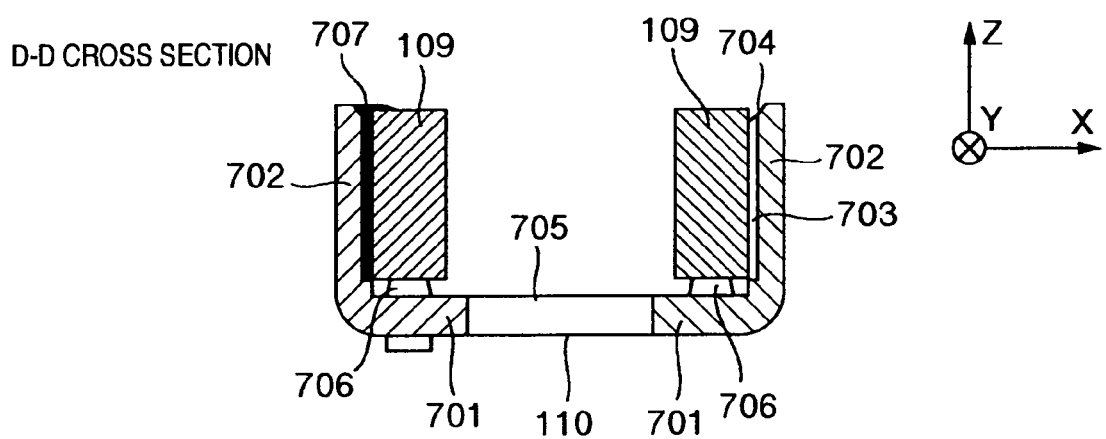

FIG.8
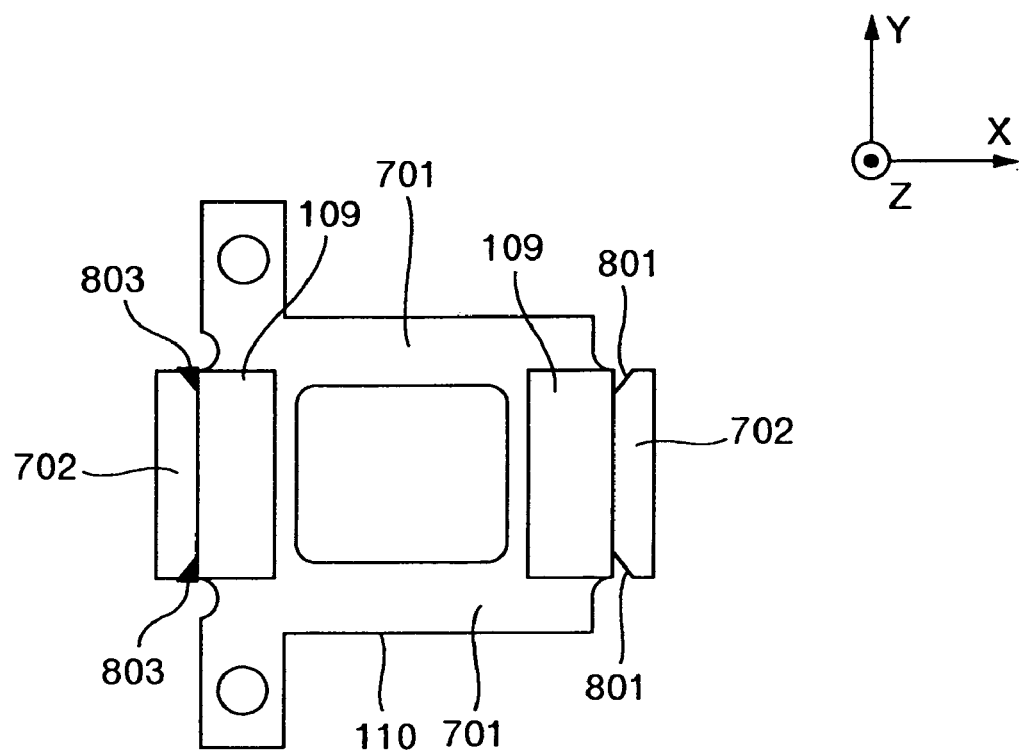
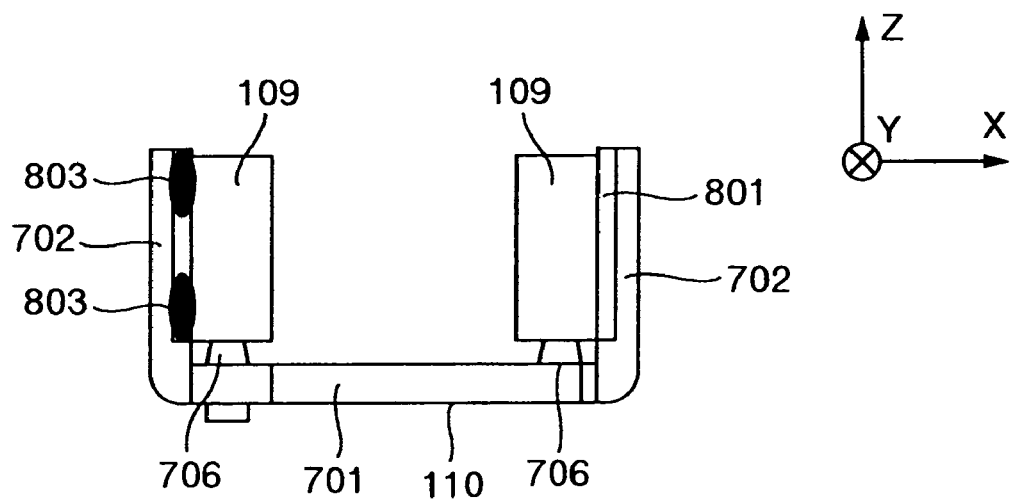

FIG.10
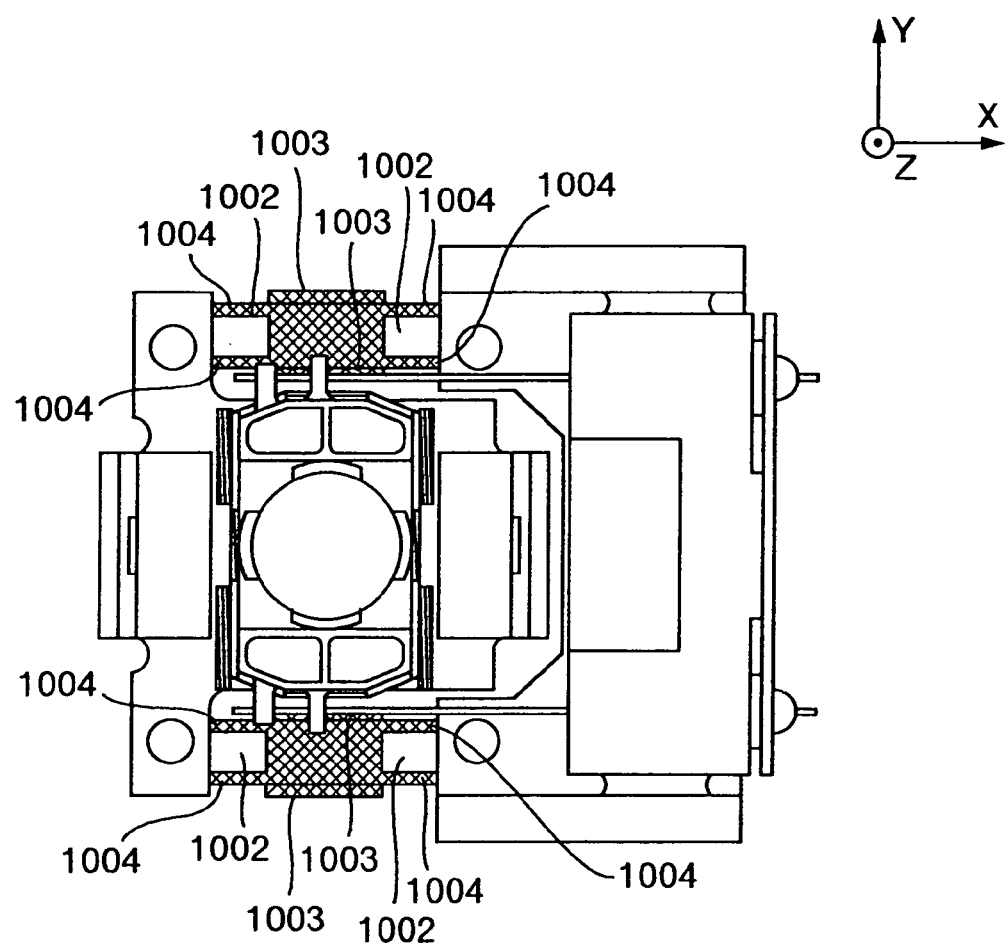
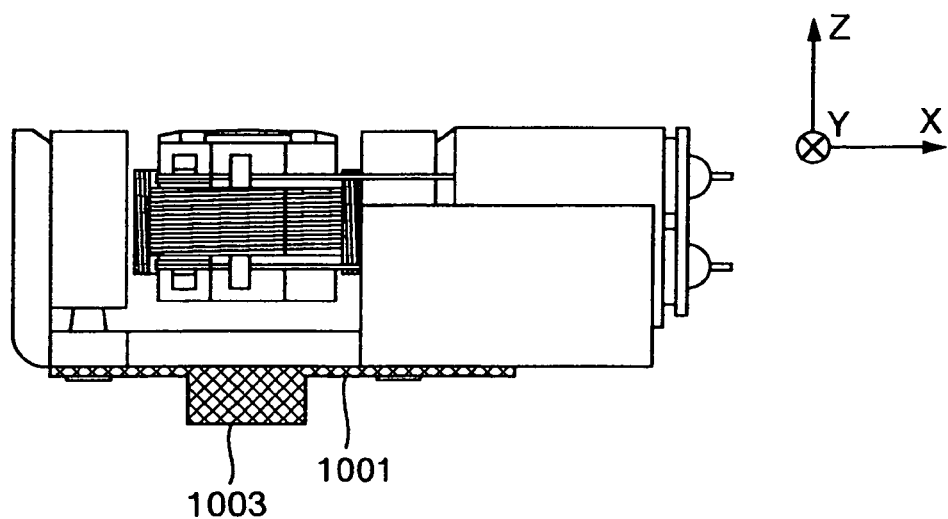

FIG.11
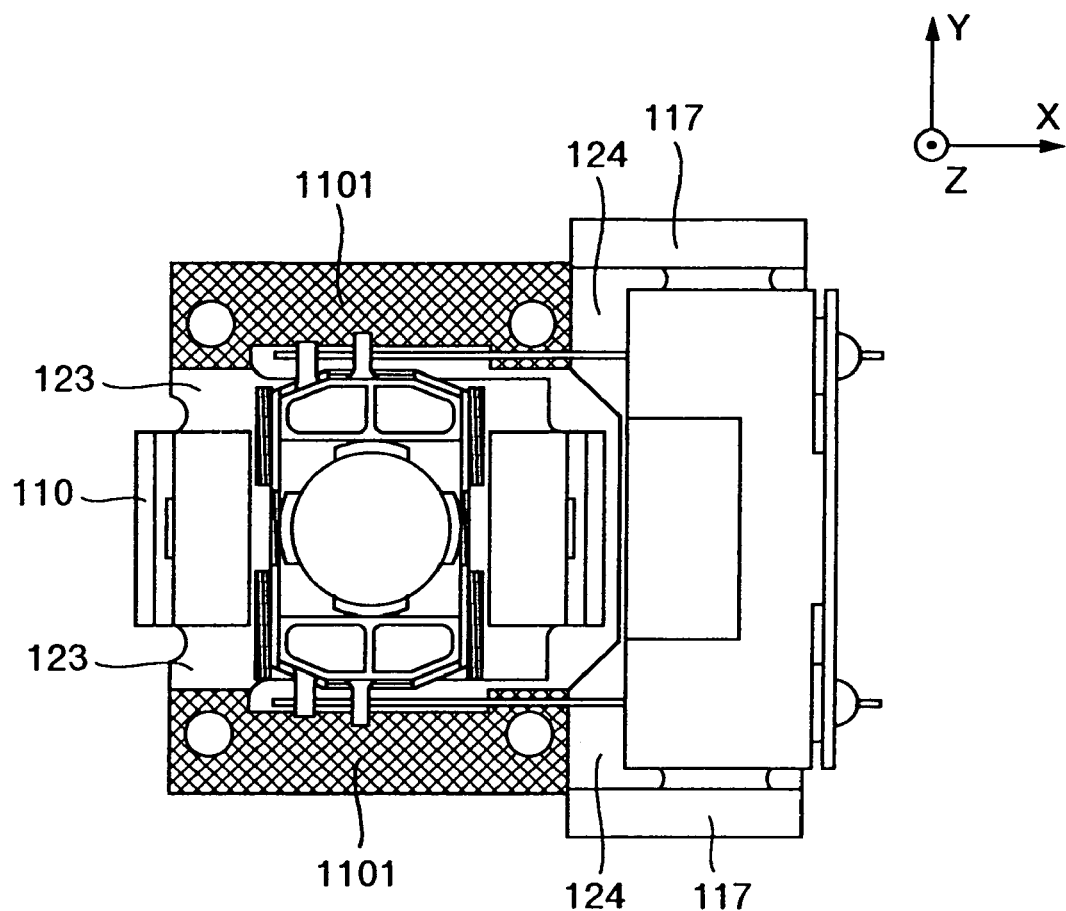
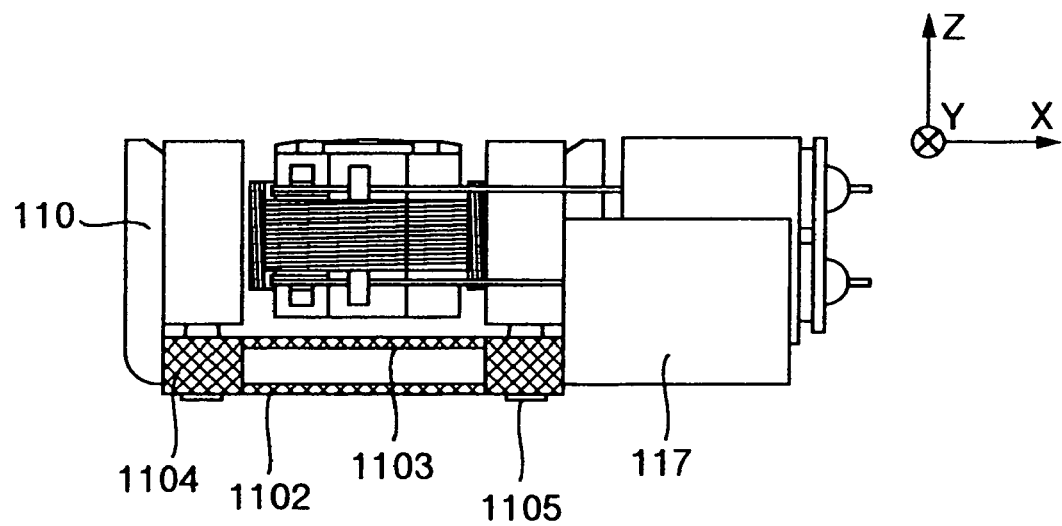

FIG.12
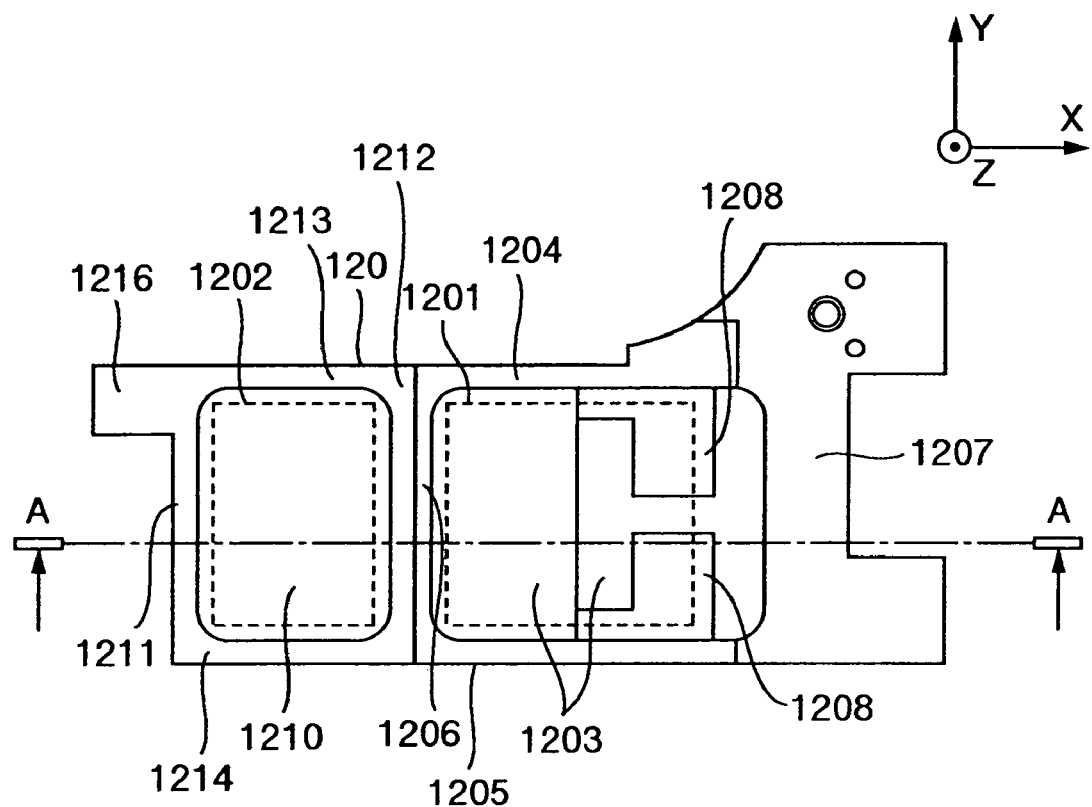
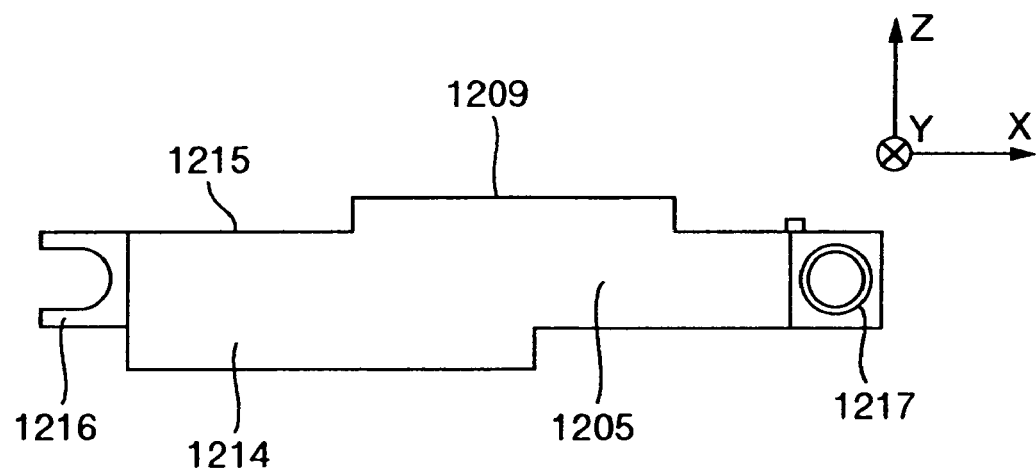

FIG.13
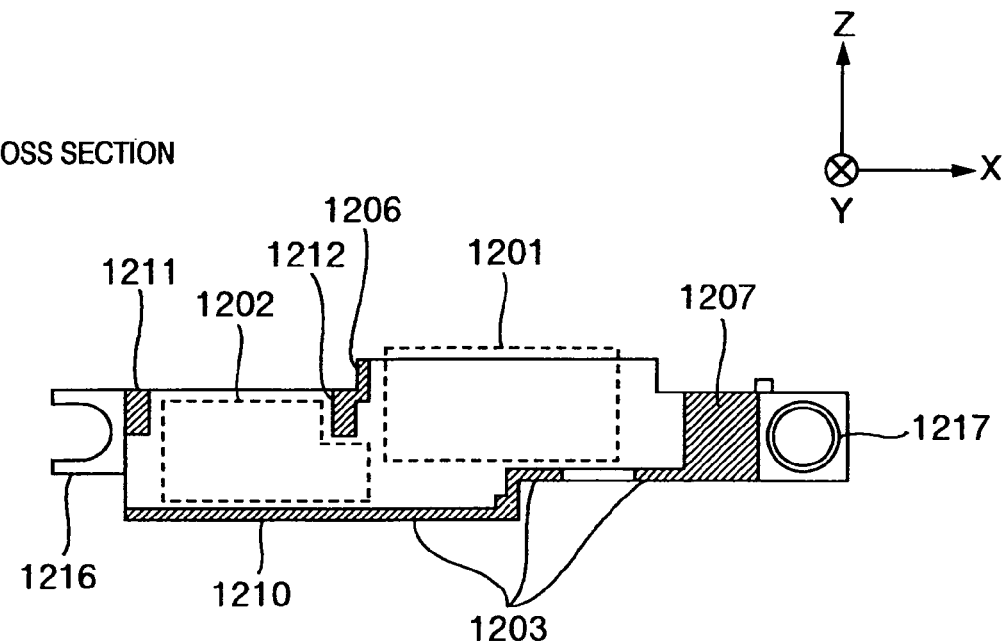
A-A CROSS SECTION
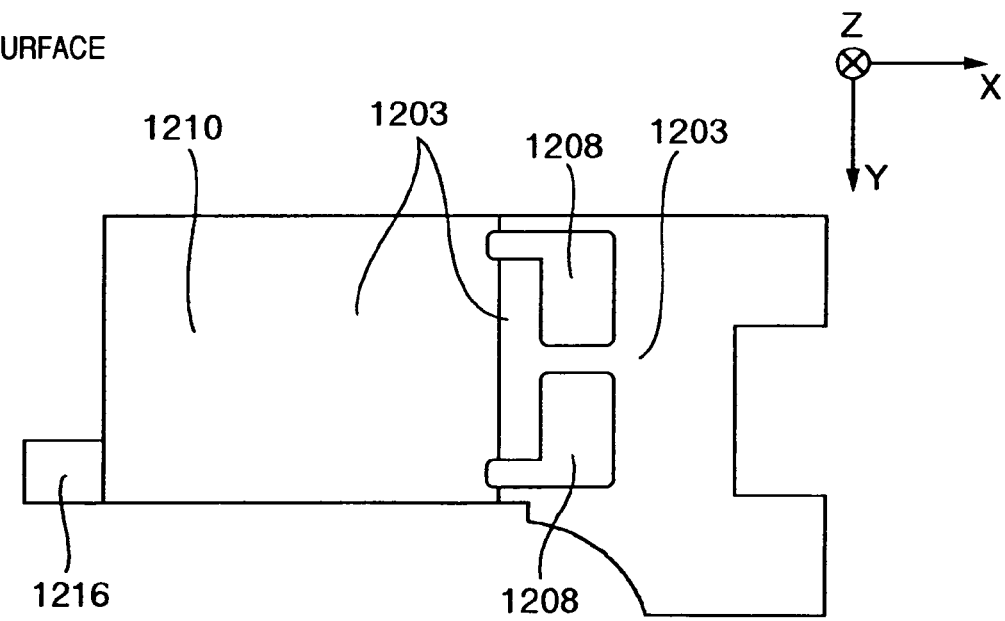
BACK SURFACE

FIG.15
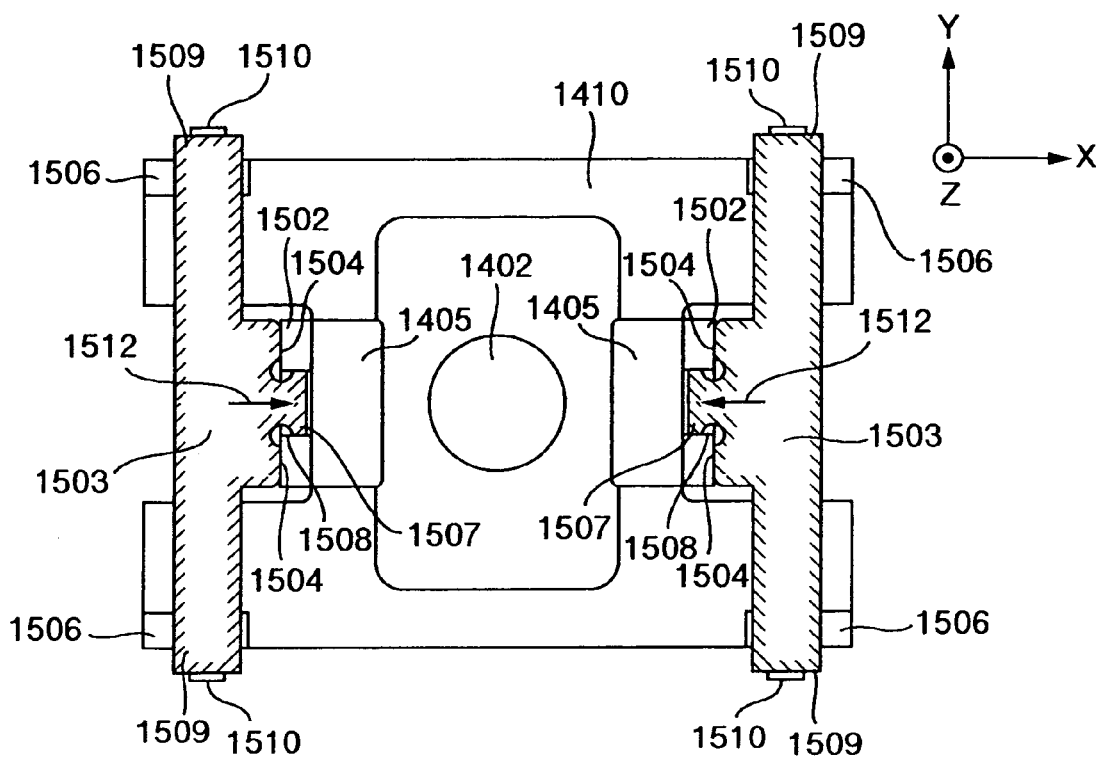
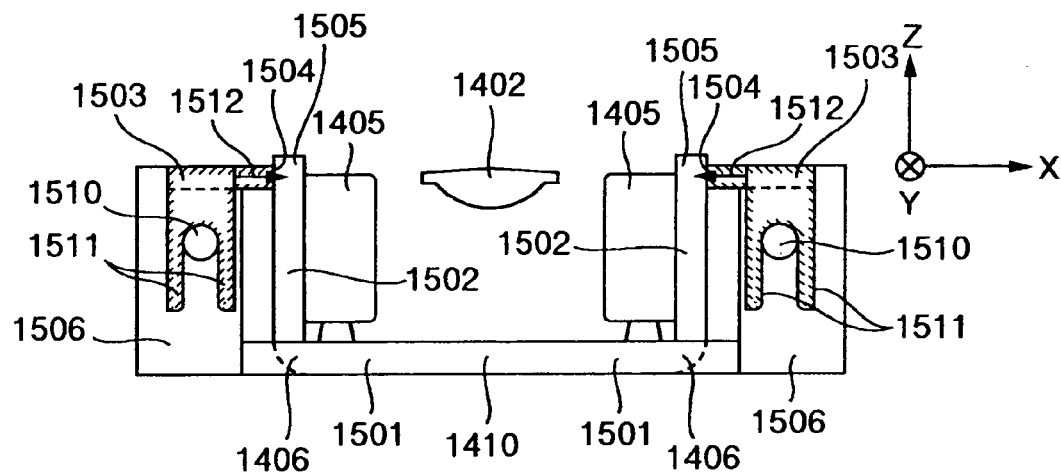

FIG.17
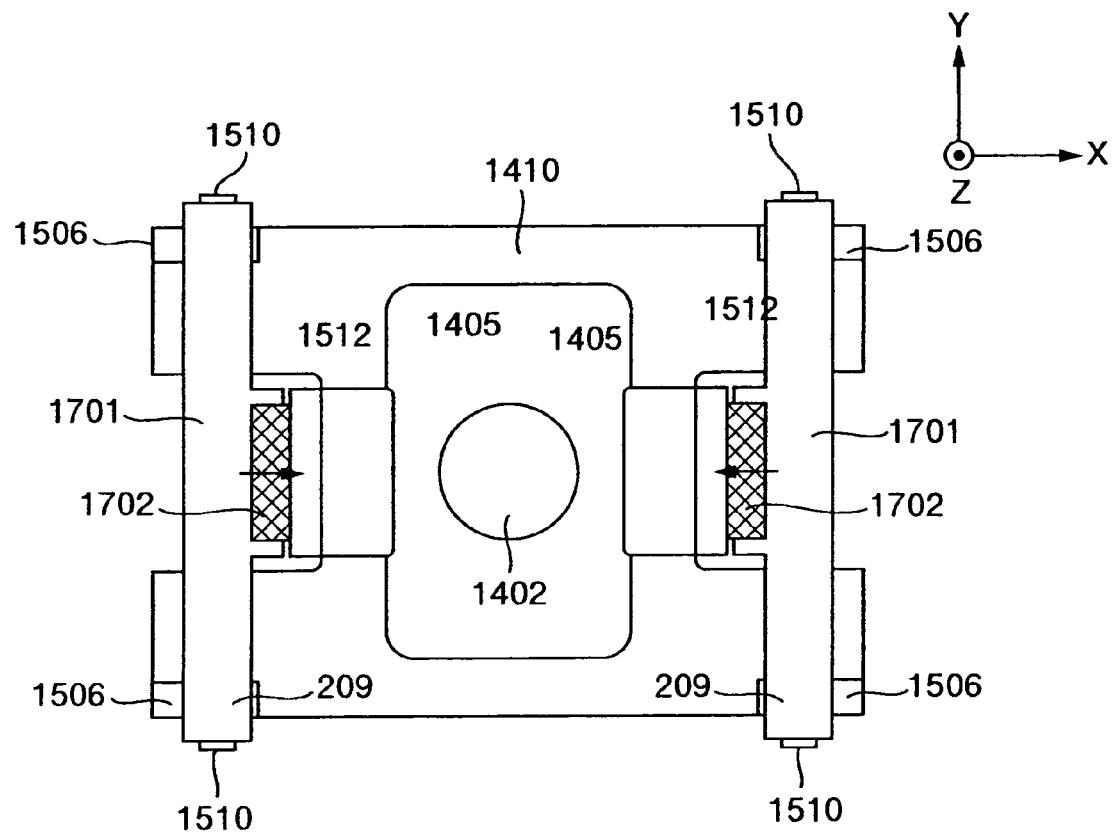
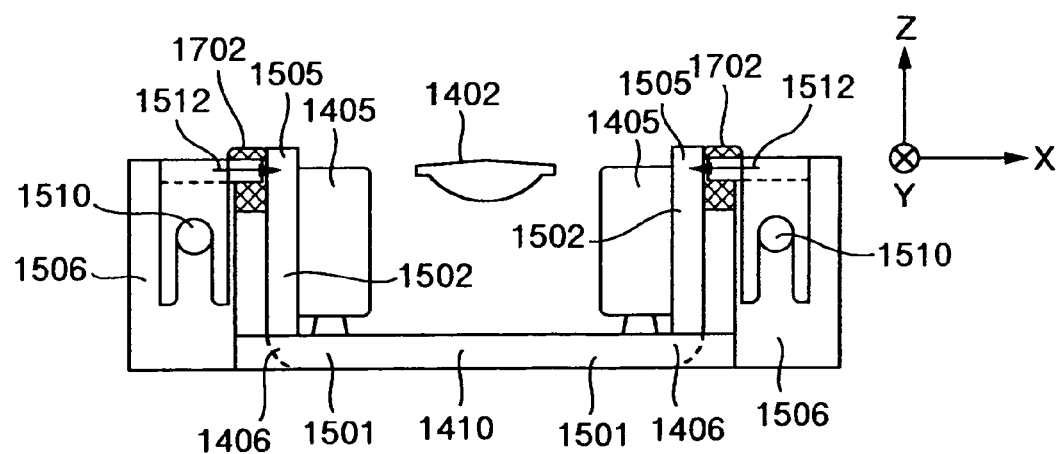

FIG.18
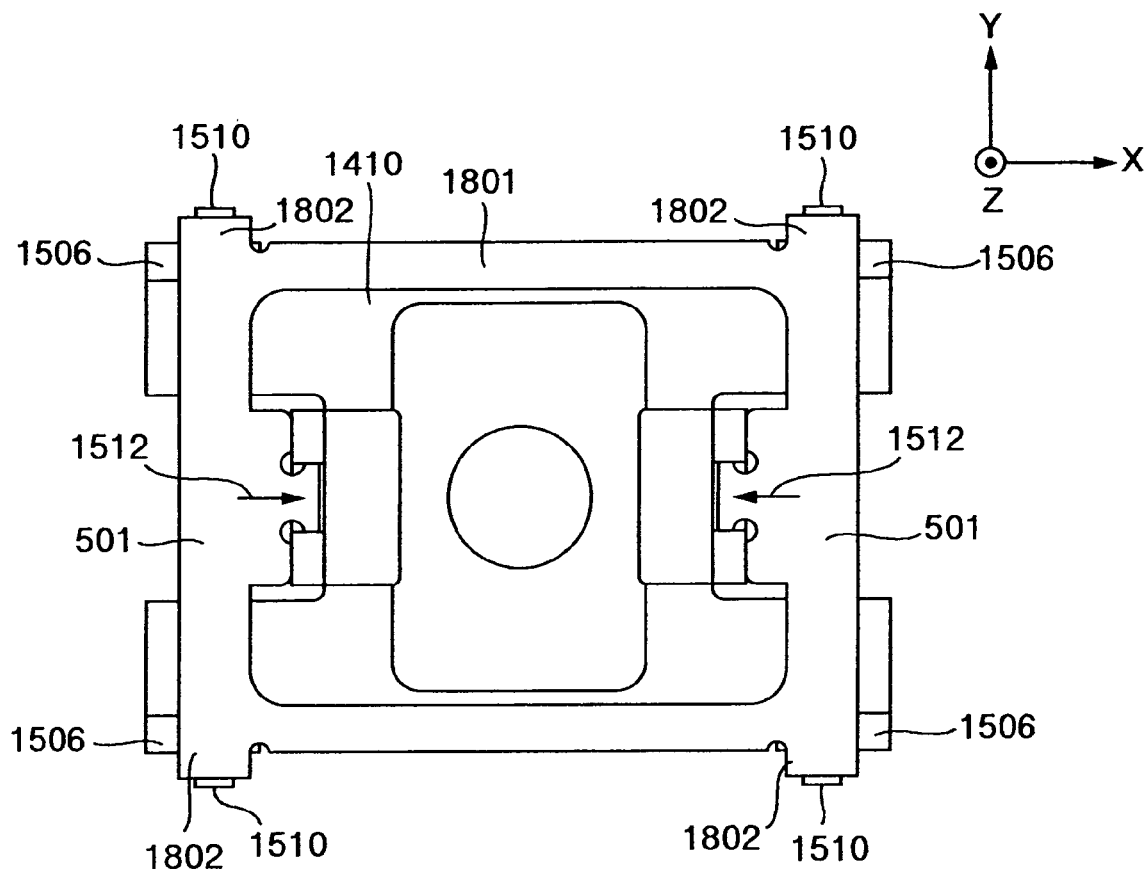
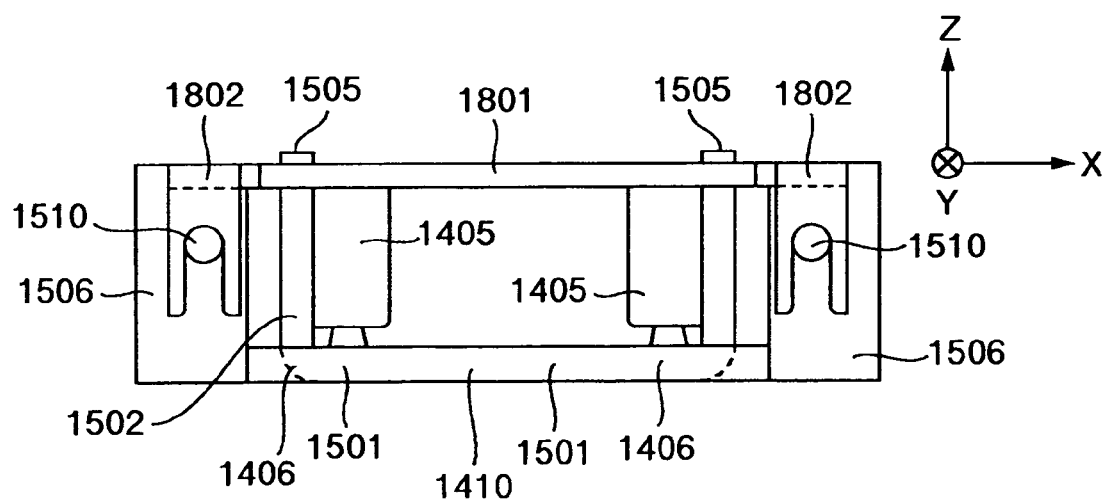

FIG.19
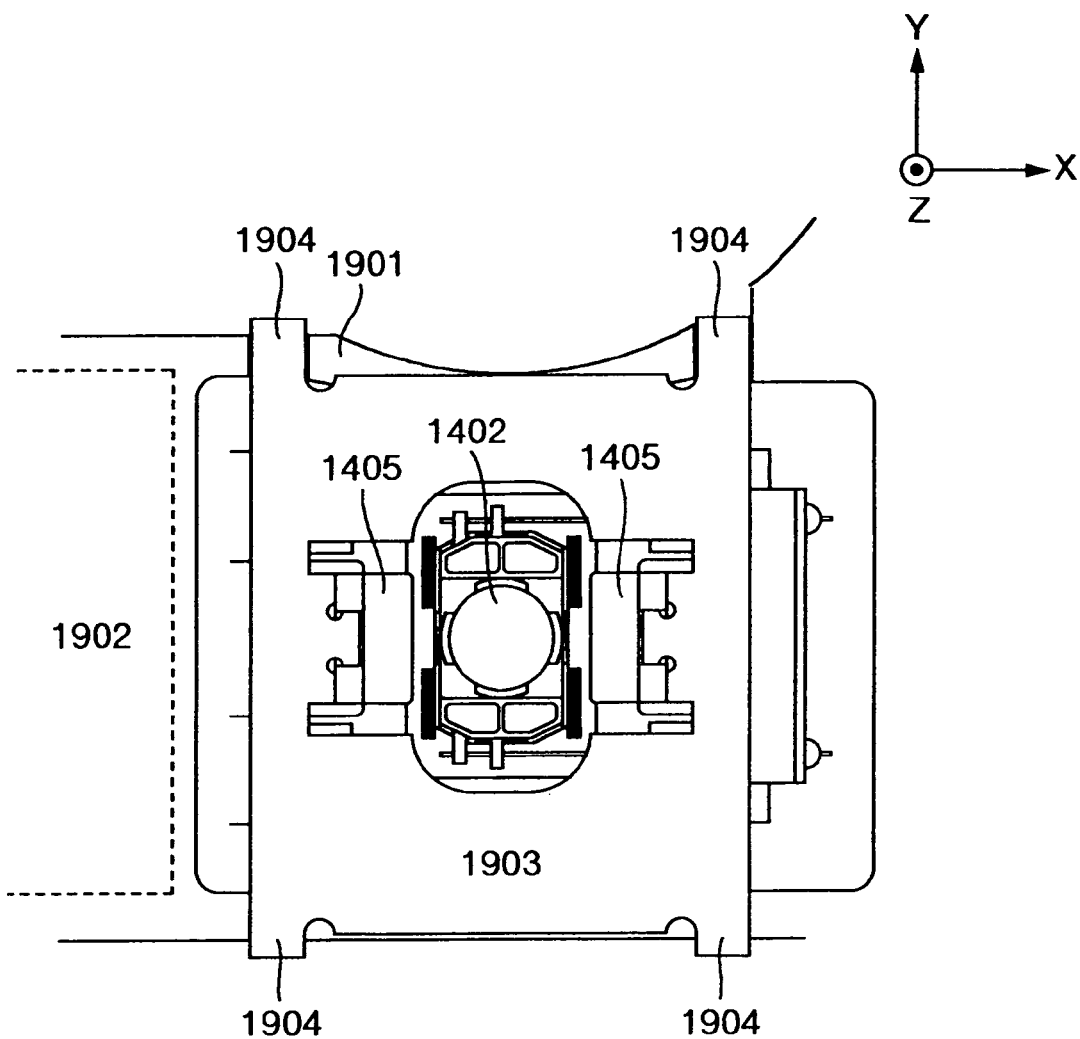
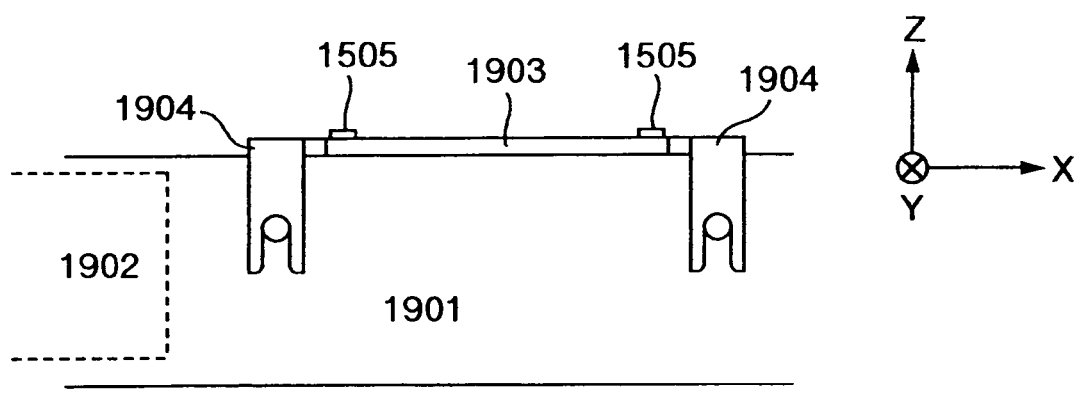

FIG.20
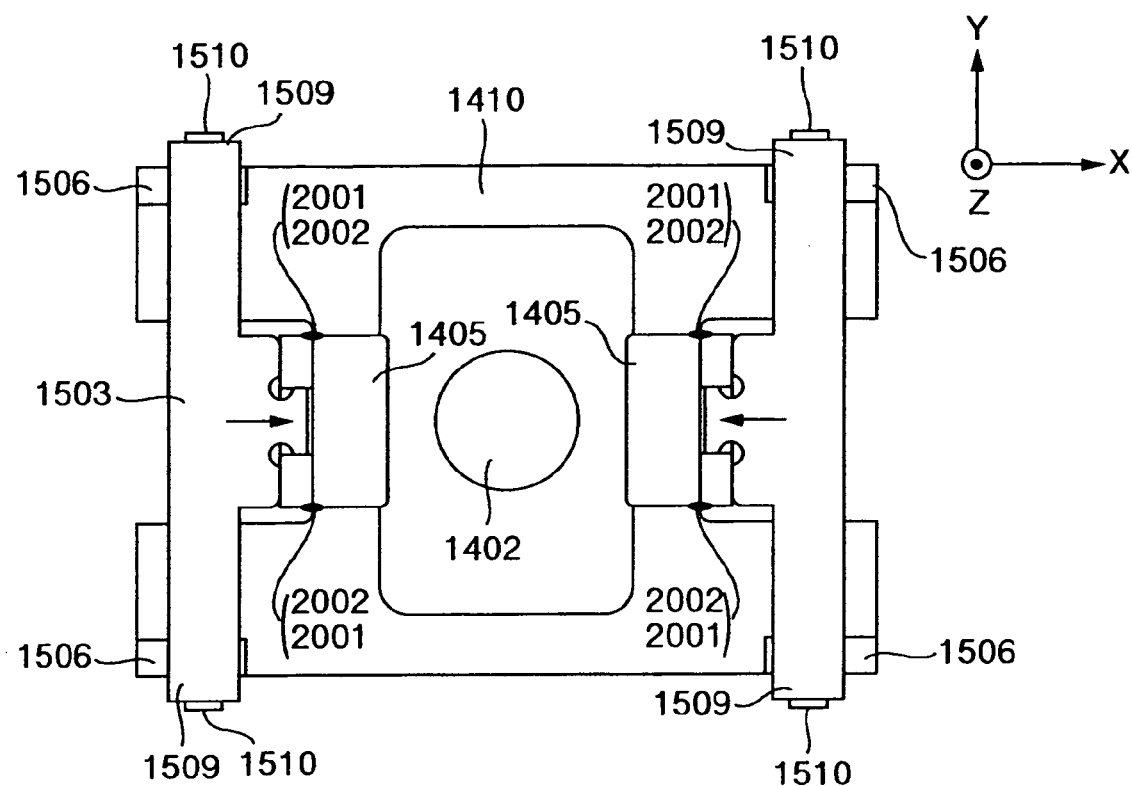
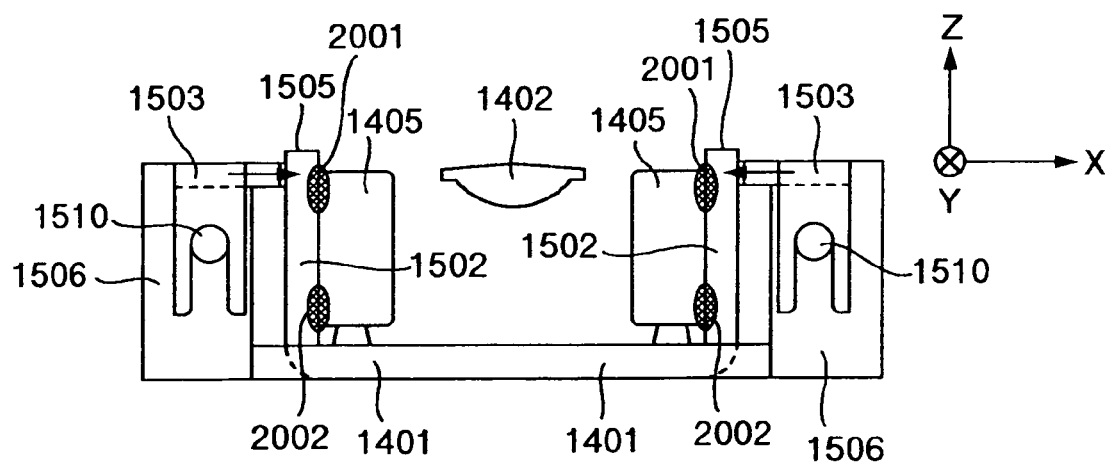

FIG.21
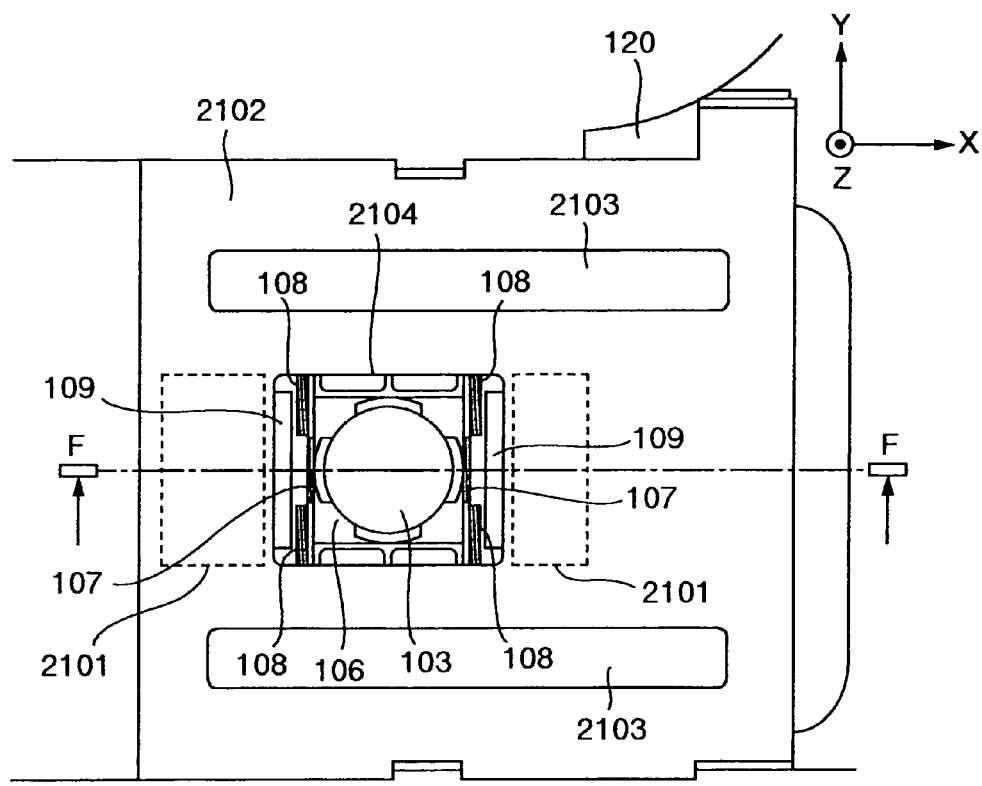
F-F CROSS SECTION
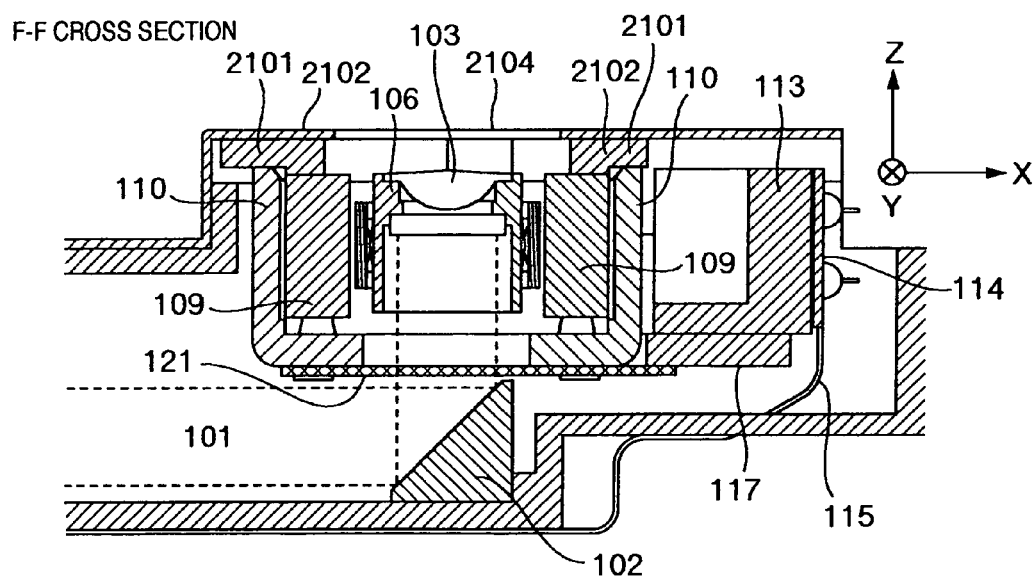

FIG.22
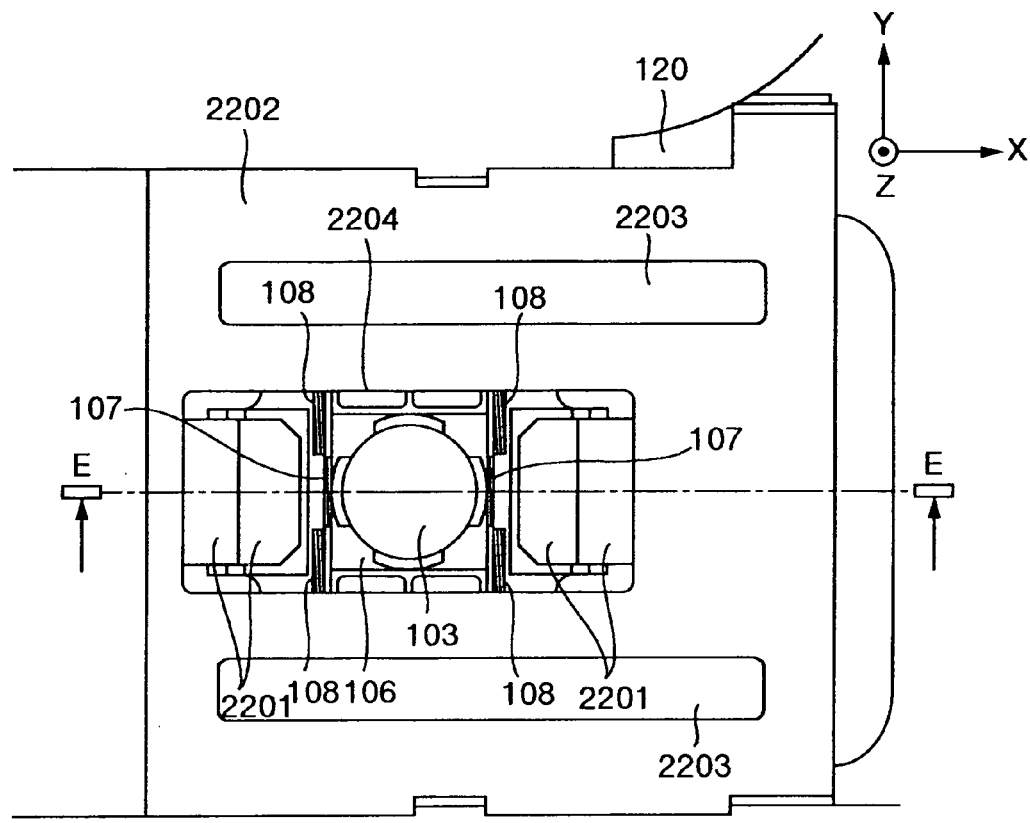
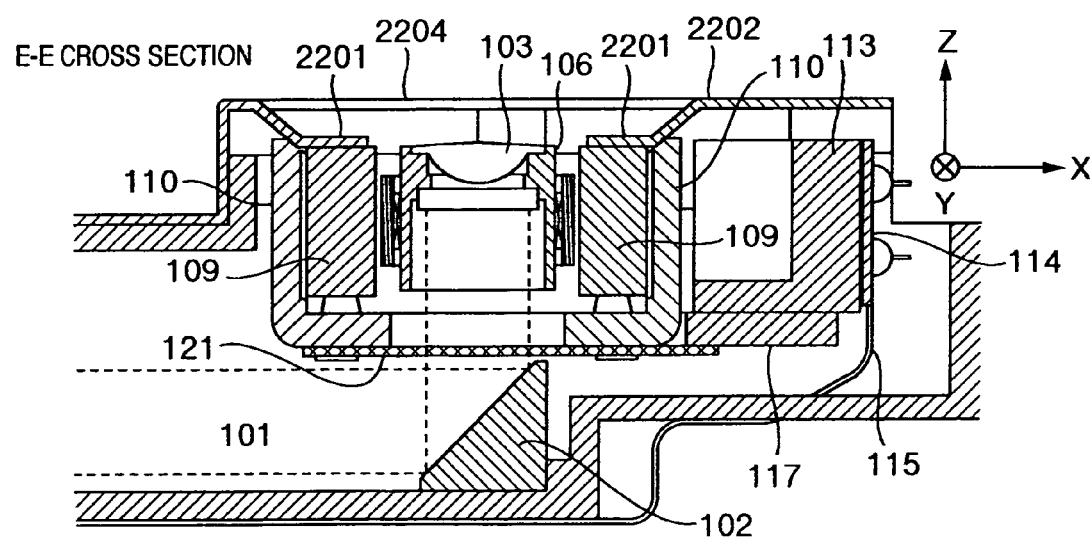
E-E CROSS SECTION

FIG.28
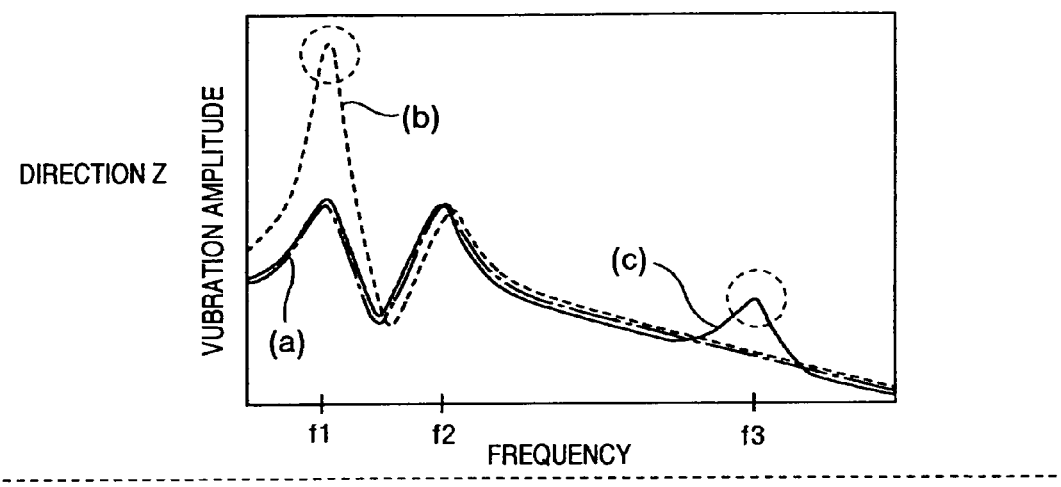
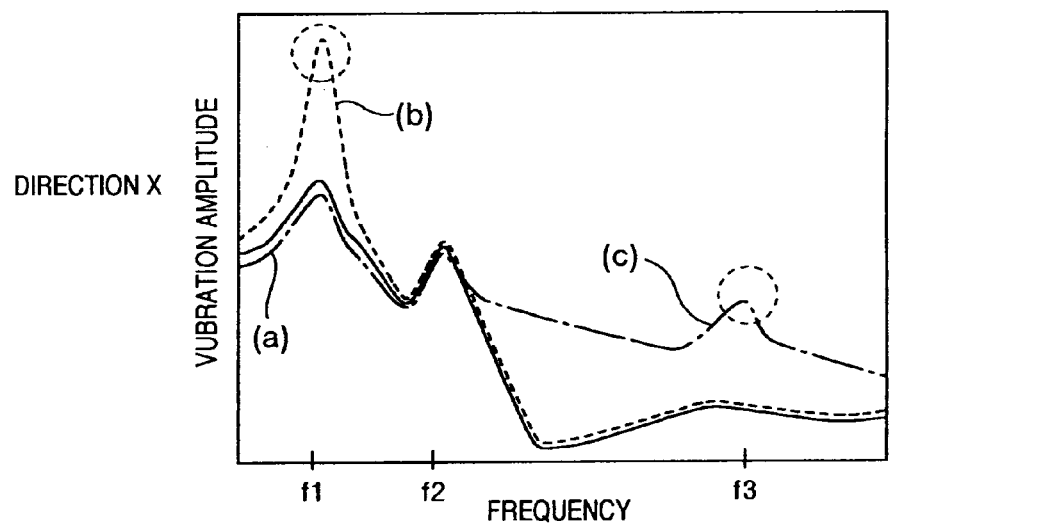
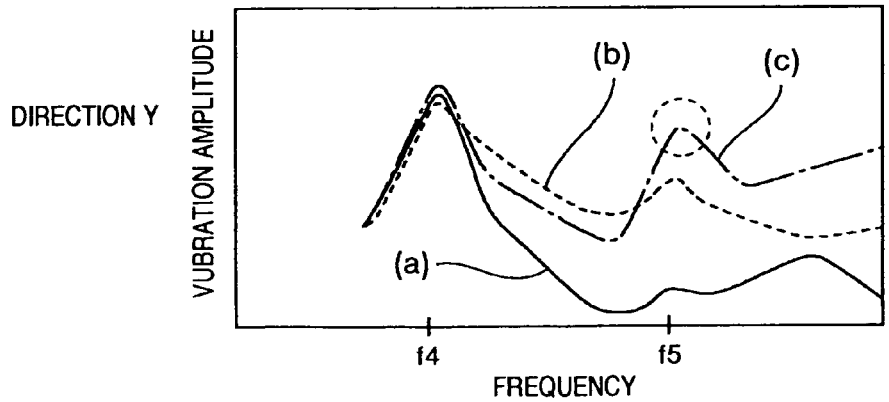

FIG.29
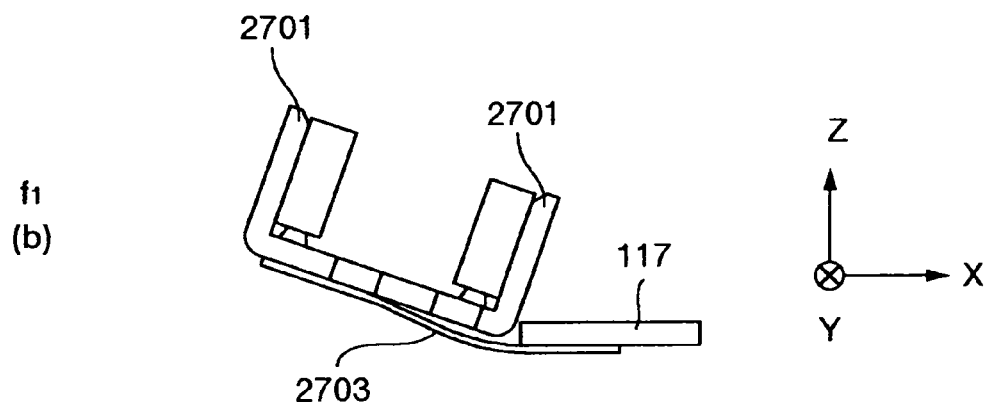
f1
(b)
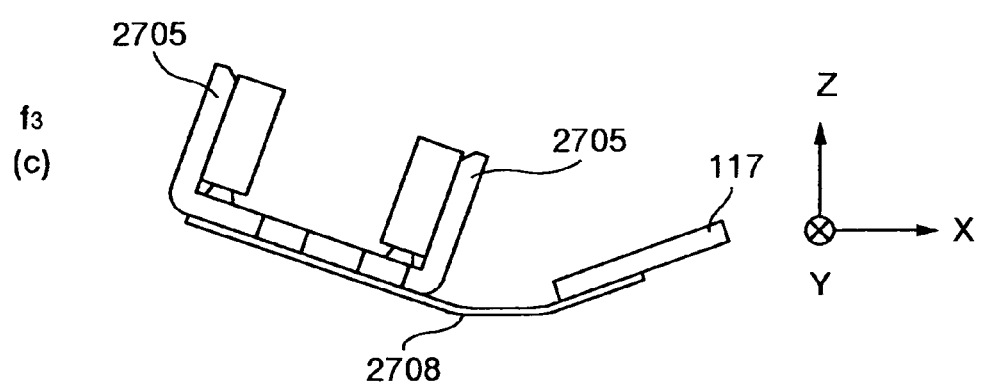
f3
(c)
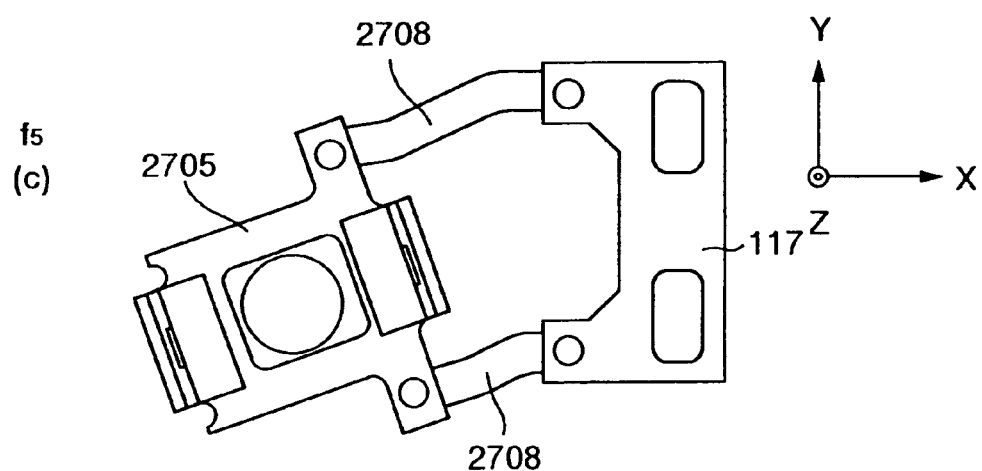
f5
(c)

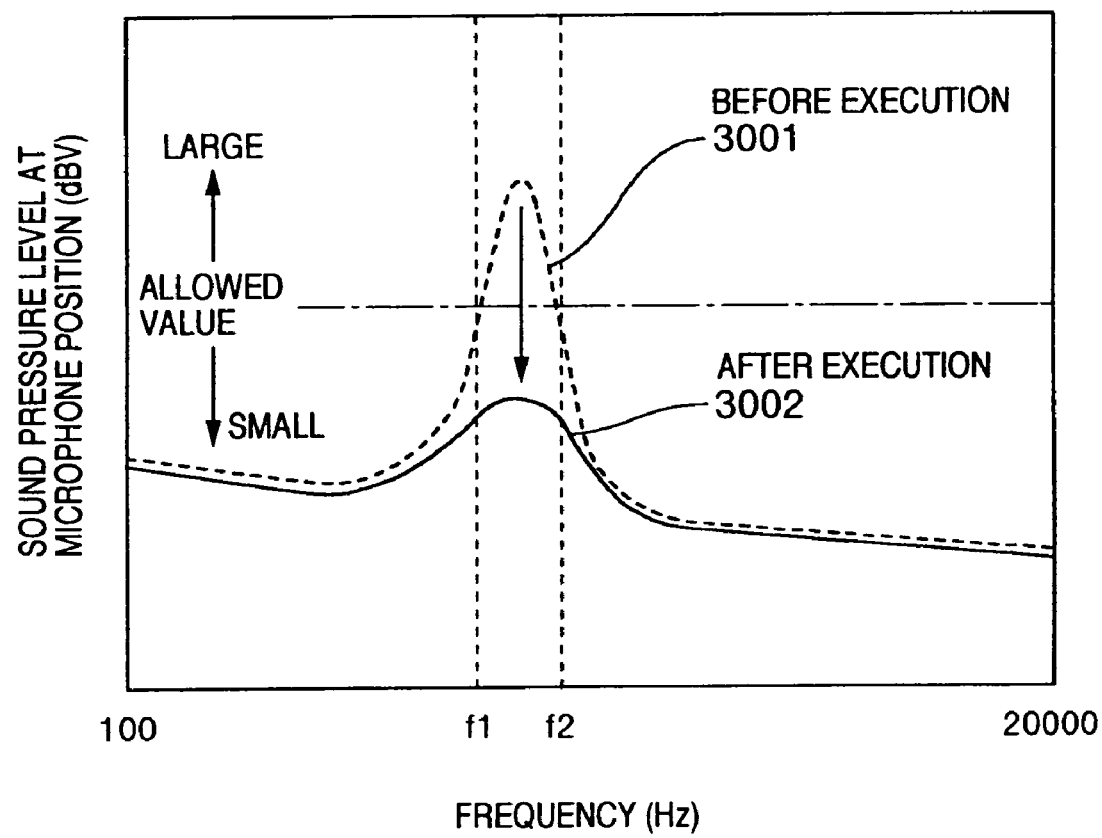

FIG.32 (PRIOR ART)
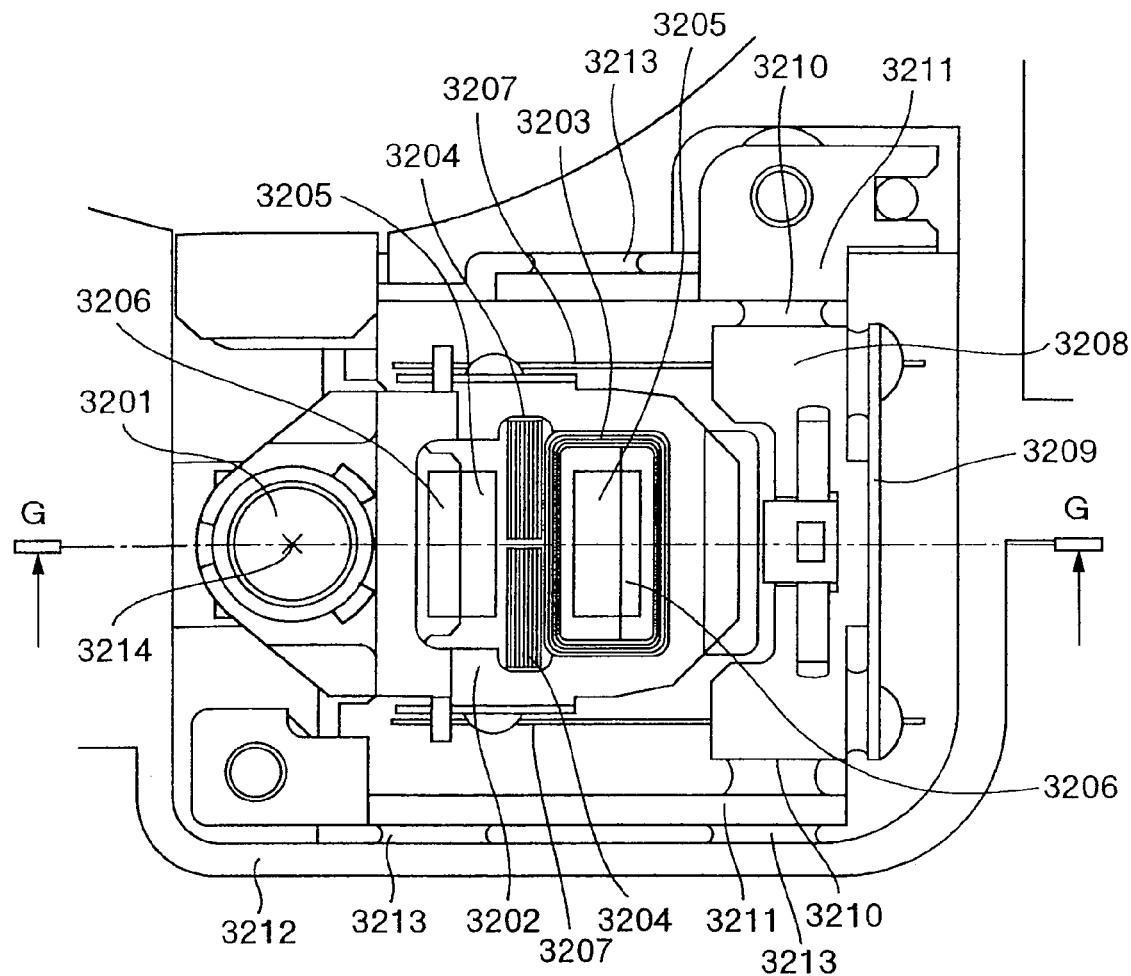
G-G CROSS SECTION
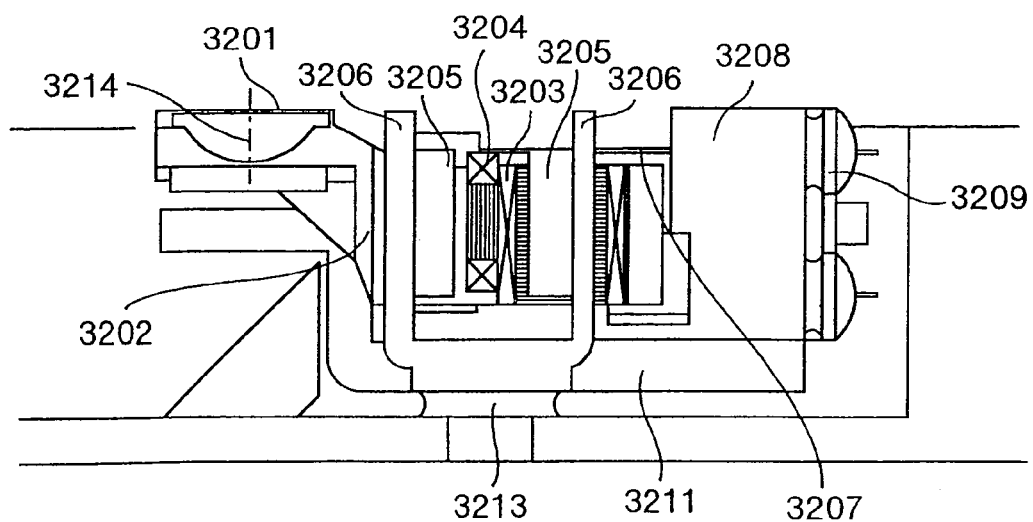

OPTICAL PICKUP AND OPTICAL DISC APPARATUS PROVIDED WITH THE SAME

BACKGROUND OF THE INVENTION

1. Field of the Invention

The present invention relates to a technique for recording or reproducing information by irradiating a laser beam onto a disc medium.

2. Description of the Prior Art

At present, an apparatus using an optical disc corresponding to a large capacity removable medium is commercially manufactured as an external information storing apparatus for a personal computer or the like. The apparatus is structured such that a disc medium is mounted to a spindle motor by a loading mechanism provided in an inner portion, an optical pickup for irradiating an optical spot on an information recording surface is provided so as to oppose to the disc medium, and the optical spot is irradiated onto the disc medium so as to record or reproduce a signal. A laser light source, a prism for irradiating a laser beam outgoing from the laser light source onto the disc medium, an optical element such as an objective lens or the like, a light detecting portion for detecting a reflected light from the optical disc so as to convert into an electric signal, an objective lens driving portion for controlling a focal point of a light spot to a target position on the disc recording medium surface, and the like are mounted in the optical pickup mentioned above. The objective lens driving portion is structured such as to finely move the objective lens in a direction of an optical axis in correspondence to a surface deflection amount of the rotating disc medium, and finely move the objective lens in a track direction of the disc medium in correspondence to a track displacement amount. An embodiment of structure of the objective lens driving portion for the optical pickup mentioned above is disclosed in JP-A-6-89448 and the like. In this case, a description will be given below of the objective lens driving portion of the optical pickup which has been conventionally employed, with reference to FIG. 32. In FIG. 32, reference numeral 3201 denotes an objective lens, which is mounted to a front end portion of a lens holder 3202. A focus coil 3203 to which a coil is applied by a copper wire or the like is mounted to an inner portion of the lens holder 3202, and two tracking coils 3204 to which a coil is applied by a copper wire or the like are mounted to an outer side of the focus coil 3203. Two magnets 3205 are provided in the focus coil 3203 and the tracking coil 3204 so as to oppose to each other with a predetermined gap, and the magnets 3205 are mounted to a yoke 3206 made of a magnetic material such as an iron or the like. One ends of four suspensions 3207 are mounted to right and left side surfaces of the lens holder 3202, and the focus coil 3203 and the tracking coil 3204 are electrically connected. Further, the other ends of the suspensions 3207 are mounted to a connection base plate 3209 attached to a suspension holder 3208 in accordance with a soldering or the other means, and right and left side surfaces of the suspension holder 3208 are fixed to a unit base 3211 by an adhesive portion 3210. The yoke 3206 and the unit base 3211 are integrally formed in accordance with a press molding or the other means, and a side surface and a bottom surface in the unit base 3211 are fixed to a casing 3212 by an adhesive portion 3213 after predetermined position and attitude are determined with respect to an optical system (not shown) provided in a casing 3212 of the optical pickup. In this state, the lens holder 3202 including the objective lens 3201 is supported so as to freely move in parallel in a surface deflecting direction (Z direction in this drawing) of the optical disc and a radial direction (Y direction in this drawing), and the structure is made such that a thrust due to an electromagnetic force is applied by controlling so as to apply an electric current to the focus coil 3203 and the tracking coil 3204, whereby the lens holder 3202 is driven in a focus direction (Z direction in this drawing) or a tracking direction (Y direction in this drawing).

The optical disc apparatus described above is, at the present time, mainly used in an aspect of being connected to an information equipment such as a personal computer or the like via a cable, or being installed in the information equipment such as a notebook computer or the like, or the like.

At present, the optical disc apparatus is structured such as to be mainly used in the aspect described in the prior art mentioned above, however, there has been proposed, for example, a portable optical disc camera apparatus (the disc medium employs, for example, a digital versatile disc-random access memory (DVD-RAM)) capable of photographing a digital moving image and static image, as a new type optical disc apparatus in which a microphone for recording an external voice is installed. In the optical disc camera apparatus mentioned above, components such as an imaging system, a recording microphone, an optical disc drive, a signal processing circuit and the like are mounted within a casing, and the recording microphone is arranged close to the optical disc drive for the purpose of making a whole of the apparatus compact. Accordingly, in an operation of the optical disc drive, (1) there is a case that an operation sound having a peak in a frequency band range between some KHz and 10 KHz jumps into the recording microphone, whereby a reproduction sound quality is deteriorated, and (2) there is a case that the operation sound having the peak in the frequency band range between some KHz and 10 KHz leaks from the casing of the apparatus, thereby striking harshly upon the ear.

As a result of considering a reason by which the operation sound is generated, it has been known that one of main reasons by which the operation sound in the band range between some KHz and 10 KHz is generated, exists a matter that in the objective lens driving portion (FIG. 32) of the conventional optical pickup arranged in opposite to the disc surface at a time of a focusing operation mode and a tracking operation mode, the yoke corresponding to the constituting element finely vibrates, the fine vibration is input to the objective lens driving unit via a loop of a focus and tracking servo control system so as to constitute a disturbance, and this state is repeated, whereby the fine vibration is amplified and appears on the operation sound. Further, it has been known that together with dispersion on manufacturing, a rotational vibration which is fined in the lens holder for holding the objective lens is easily generated in the objective lens driving portion (FIG. 32) of the conventional optical pickup, the fine rotational vibration vibrates the yoke and is amplified via the loop of the focus and tracking servo control system so as to appear on the operation sound. At this time, in a frequency characteristic (a response displacement and a phase characteristic) of the focus and tracking servo control system, there is not generated a response turbulence which generates a problem in view of the servo control, and a recording and reproducing operation on the disc is normally executed. As a result of the above, it can be said that no deterioration is generated in the response of the objective lens with respect to the disc, that is, the light spot on the disc surface. In the conventional optical disc apparatus, the turbulence which will generate the problem in view of executing the servo control is not produced in the frequency characteristic (the gain and phase characteristics) of the focus and tracking servo control system, as mentioned above, and the operation sound in the band range between some KHz and 10 KHz which is generated due to the operation of the objective lens driving portion generates a problem hardly produces the problem, in a state in which the recording and reproducing operation on the disc is normally executed.

As mentioned above, in the case that the objective lens driving portion of the optical pickup is operated, the operation sound in the band range between some KHz and 10 KHz which is caused by the fine vibration generated from the yoke corresponding to the constituting element even in the state in which the objective lens and by extension the optical spot normally responds, and the fine rotational vibration generated by the lens holder holding the objective lens due to the dispersion on manufacturing becomes a new problem which is hardly considered in the conventional optical disc apparatus in view of achieving the optical disc camera installing the recording microphone therein. Accordingly, in order to reduce the operation sound in the band range between some KHz and 10 KHz, it is necessary to reduce the operation sound generated from the yoke corresponding to the constituting element of the objective lens driving portion and the rotational vibration of the lens holder holding the objective lens in spite of the dispersion on manufacturing.

SUMMARY OF THE INVENTION

The present invention is made by taking the points mentioned above into consideration, and an object of the present invention is to provide an optical disc apparatus which restricts an operation sound generated from an objective lens driving portion of an optical pickup, corresponds to the portable utilization mentioned above and has a reduce sound, in an optical disc apparatus, in particular, an optical disc apparatus installing a microphone for recording an external voice therein.

In order to solve the problem mentioned above, in accordance with the present invention, there is provided an optical pickup comprising:

an optical system focusing a light beam emitted from a laser light source on an information recording surface of a disc-like recording medium via optical devices such as a prism, an objective lens and the like and making a light beam reflected on the information recording surface entering into an optical detector via the optical devices, in a state of being equipped in an optical disc apparatus;

a lens holder holding the objective lens and attaching a coil to which a coil winding is applied thereto;

a unit base supporting the lens holder via a suspension in such a manner as to freely move in a thickness direction and a radial direction of the disc-like recording medium;

a magnet generating a magnetic field passing through the coil;

a yoke mounting the magnet; and a casing attaching the magnet, the yoke, the optical system and the unit base thereto, wherein opposing surfaces of the coil, the magnet and the yoke are respectively arranged at substantially symmetrical positions with respect to an optical axis of the objective lens in a state in which the coil is not energized, and the yoke and the unit base are connected via a spring member so as to mount the unit base to the casing.

The optical pickup is structured such that the spring member is connected at a position apart from the objective lens with respect to the yoke.

The optical pickup is structured such that the spring member has at least a freedom of deformation toward a direction of the optical axis of the objective lens.

The optical pickup is structured such that the suspension is formed in a rod shape, and the spring member is arranged substantially in parallel to the suspension in a longitudinal direction.

The optical pickup is structured such that a resin material is charged into at least any one or both of a gap of a surface with which the spring member and the yoke portion are in contact, and a gap of a surface with which the spring member and the unit base are in contact.

The optical pickup is structured such that a silicone type resin material is charged into at least one or both of a space between the yoke and the casing, and a space between the yoke and the unit base.

The optical pickup is structured such that a silicone type resin is arranged in a space between the unit base and the spring member.

The optical pickup is structured such that the yoke comprises a first yoke having a predetermined thickness in a direction substantially in parallel to the disc-like recording medium, and a second yoke bent substantially perpendicularly to the first yoke so as to have a predetermined thickness, connected to the first yoke at one end and opposing to the disc-like recording medium at another end, and an independent member is mounted to the first yoke in a state in which the magnet is mounted to the second yoke.

The optical pickup is structured such that the magnet and the second yoke are connected at least in a portion close to one end and another end of the second yoke via a resin material.

The optical pickup is structured such that the casing is formed in a closed structure surrounding the space in which the unit base, the lens holder supported to the unit base via the suspension, and the yoke and the magnet which are connected via the spring member are arranged, except a surface opposing to the disc-like recording medium.

The optical pickup is structured such that the casing is formed by an aluminum die casting material, a zinc die casting material or a mixed die casting material between an aluminum and a zinc.

The optical pickup is structured such that a relative position adjusting structure between the coil attached to the lens holder and the magnet mounted to the yoke is provided.

There is provided an optical pickup comprising:

an optical system focusing a light beam emitted from a laser light source on an information recording surface of a disc-like recording medium via optical devices such as a prism, an objective lens and the like and making a light beam reflected on the information recording surface entering into an optical detector via the optical devices, in a state of being equipped in an optical disc apparatus;

a lens holder holding the objective lens and attaching a coil to which a coil winding is applied thereto;

a unit base supporting the lens holder via a suspension in such a manner as to freely move in a thickness direction and a radial direction of the disc-like recording medium;

a magnet generating a magnetic field passing through the coil;

a yoke mounting the magnet; and a casing attaching the magnet, the yoke, the optical system and the unit base thereto, wherein a contact member mounted to the unit base or the casing is structured such as to be in contact with the yoke.

The optical pickup is structured such that the yoke comprises a first yoke having a predetermined thickness in a direction substantially in parallel to the disc-like recording medium, and a second yoke bent substantially perpendicularly to the first yoke so as to have a predetermined thickness, connected to the first yoke at one end and opposing to the disc-like recording medium at another end, and in a state in which the magnet is mounted to the second yoke, one in the contact member is energized from a direction parallel to the thickness direction of the second yoke with respect to a portion close to another end of the second yoke and another in the contact member is fixed to the unit base or the casing.

The optical pickup is structured such that the yoke comprises a first yoke having a predetermined thickness in a direction substantially in parallel to the disc-like recording medium, and a second yoke bent substantially perpendicularly to the first yoke so as to have a predetermined thickness, connected to the first yoke at one end and opposing to the disc-like recording medium at another end, and in a state in which the magnet is mounted to the second yoke, one in the contact member is connected to a portion close to another end of the second yoke from a direction parallel to the thickness direction of the second yoke via a resin member and another in the contact member is fixed to the unit base or the casing.

The optical pickup is structured such that the contact member is integrally formed with a cover and mounted to the casing.

The optical pickup is structured such that the magnet and the second yoke is connected to at least one end and near another end of the second yoke via a resin member.

There is provided an optical pickup comprising:

an optical system focusing a light beam emitted from a laser light source on an information recording surface of a disc-like recording medium via optical devices such as a prism, an objective lens and the like and making a light beam reflected on the information recording surface entering into an optical detector via the optical devices, in a state of being equipped in an optical disc apparatus;

a lens holder holding the objective lens and attaching a coil to which a coil winding is applied thereto;

a unit base supporting the lens holder via a suspension in such a manner as to freely move in a thickness direction and a radial direction of the disc-like recording medium;

a magnet generating a magnetic field passing through the coil;

a yoke mounting the magnet; and a casing attaching the magnet, the yoke, the optical system and the unit base thereto, wherein opposing surfaces of the coil, the magnet and the yoke are respectively arranged at substantially symmetrical positions with respect to an optical axis of the objective lens in a state in which the coil is not energized, the yoke and the unit base are connected via a spring member so as to mount the unit base to the casing, and a contact member mounted to the casing is made in contact with the yoke.

The optical pickup is structured such that the contact member is mounted to the casing via a cover.

The optical pickup is structured such that the contact member is formed by a silicone type resin or a damping material.

The optical pickup is structured such that the contact member is integrally formed with a cover so as to be mounted to the casing.

There is provided an optical disc apparatus comprising:
an optical pickup comprising:
an optical system using a disc-like recording medium, focusing a light beam emitted from a laser light source on an information recording surface of the disc-like recording medium via optical devices such as a prism, an objective lens and the like and making a light beam reflected on the information recording surface entering into an optical detector via the optical devices;

a lens holder holding the objective lens and attaching a coil to which a coil winding is applied thereto;

a unit base supporting the lens holder via a suspension in such a manner as to freely move in a thickness direction and a radial direction of the disc-like recording medium;

a magnet generating a magnetic field passing through the coil;

a yoke mounting the magnet; and a casing attaching the magnet, the yoke, the optical system and the unit base thereto,
in which the optical disc apparatus comprises:
the optical pickup as described above;
an optical pickup feeding mechanism moving the pickup in a radial direction of the disc-like recording medium;
a disc motor for attaching the disc-like recording medium thereto and rotating the disc-like medium;
a chassis mounting the optical pickup, the optical pickup feeding mechanism and the disc motor; and
an electric circuit having a signal processing system and a control system.

There is provided an optical disc apparatus comprising:
an optical pickup comprising:
an optical system using a disc-like recording medium, focusing a light beam emitted from a laser light source on an information recording surface of the disc-like recording medium via optical devices such as a prism, an objective lens and the like and making a light beam reflected on the information recording surface entering into an optical detector via the optical devices;

a lens holder holding the objective lens and attaching a coil to which a coil winding is applied thereto;

a unit base supporting the lens holder via a suspension in such a manner as to freely move in a thickness direction and a radial direction of the disc-like recording medium;

a magnet generating a magnetic field passing through the coil;

a yoke mounting the magnet; and a casing attaching the magnet, the yoke, the optical system and the unit base thereto, in which the optical disc apparatus comprises:
the optical pickup as described above;
an optical pickup feeding mechanism moving the pickup in a radial direction of the disc-like recording medium;
a disc motor for attaching the disc-like recording medium thereto and rotating the disc-like medium;
a chassis mounting the optical pickup, the optical pickup feeding mechanism and the disc motor; and
an electric circuit having a signal processing system and a control system.

There is provided an optical disc apparatus comprising:
an optical pickup comprising:
an optical system using a disc-like recording medium, focusing a light beam emitted from a laser light source on an information recording surface of the disc-like recording medium via optical devices such as a prism, an objective lens and the like and making a light beam reflected on the information recording surface entering into an optical detector via the optical devices;

a lens holder holding the objective lens and attaching a coil to which a coil winding is applied thereto;

a unit base supporting the lens holder via a suspension in such a manner as to freely move in a thickness direction and a radial direction of the disc-like recording medium;

a magnet generating a magnetic field passing through the coil;

a yoke mounting the magnet; and a casing attaching the magnet, the yoke, the optical system and the unit base thereto,
in which the optical disc apparatus comprises:
the optical pickup as described above;
an optical pickup feeding mechanism moving the pickup in a radial direction of the disc-like recording medium;
a disc motor for attaching the disc-like recording medium thereto and rotating the disc-like medium;
a chassis mounting the optical pickup, the optical pickup feeding mechanism and the disc motor; and
an electric circuit having a signal processing system and a control system.

Otherwise, in order to solve the problems mentioned above, in accordance with the present invention, there is provided an optical pickup comprising:
 a laser light source;
 an objective lens focusing a light beam emitted from the laser light source on an information recording medium;
 a lens holder having the objective lens and a coil;
 a magnet driving the coil;
 a magnet fixing member fixing the magnet; and
 a unit base supporting the lens holder, wherein the magnet fixing member is connected to the unit base at a position far from an optical axis of the objective lens with respect to the unit base by using an elastic member.

In this case, the magnet fixing member generally includes a so-called yoke, however, is not limited to this, and any member may be employed as far as it fixes the magnet.

Further, in order to solve the problems mentioned above, in accordance with the present invention, the structure is made such that the coil provided in the lens holder is arranged at a substantially point symmetrical position with respect to the optical axis of the objective lens, and the magnet is arranged at a substantially point symmetrical position with respect to the optical axis of the objective lens.

Other objects, features and advantages of the invention will become apparent from the following description of the embodiments of the invention taken in conjunction with the accompanying drawings.

BRIEF DESCRIPTION OF THE DRAWINGS

FIG. 4 is a view showing another embodiment with respect to a connection among a unit base 117, a yoke 110 and a spring member 118 shown in FIGS. 1 to 3;

FIG. 6 is a view showing an embodiment in which a damping is applied to a vibration system comprising the spring member 118, the yoke 110 and the magnet 109 shown in FIGS. 1 to 3;

FIG. 7 is a view describing a structure of the yoke 110 shown in FIGS. 1 to 3;

FIG. 8 is a view describing a bonding structure of the magnet 109 shown in FIGS. 1 to 3;

FIG. 10 is a view showing another embodiment of the spring member 118 described in FIGS. 1 to 3;

FIG. 11 is a view showing further the other embodiment of the spring member 118 described in FIGS. 1 to 3;

FIG. 12 is a top elevational view and a side elevational view showing a structure of a casing 120;

FIG. 13 is a cross sectional view along a line A-A and a back elevational view showing the structure of the casing 120;

FIG. 15 is a view showing a main portion extracted from FIG. 14;

FIG. 17 is a view showing the other embodiment in the second operation sound restricting structure;

FIG. 18 is a view showing further the other embodiment in the second operation sound restricting structure;

FIG. 19 is a view showing further the other embodiment in the second operation sound restricting structure;

FIG. 20 is a view showing a fixing method of a magnet 1405 mounted along a second yoke 1502, in the second operation sound restricting structure;

FIG. 21 is a top elevational view and a cross sectional view along a line A-A showing an embodiment with respect to a third operation sound restricting structure;

FIG. 22 is a top elevational view and a cross sectional view along a line A-A showing another embodiment with respect to the third operation sound restricting structure;

FIG. 28 is a view showing an embodiment in which a vibration response analysis of the yokes 110, 2701 and 2705 is executed in each of cases in FIGS. 27A to 27C;

FIG. 29 is a view showing an embodiment in which a vibration mode analysis is executed;

FIG. 30 is a view showing a result obtained by measuring a frequency property of an operation sound generated in the case that a movable portion including an objective lens 1402 operates in an optical disc apparatus mounting the second operation sound restricting structure thereon, at a position of a recording microphone;

FIG. 32 is a view showing an objective lens driving portion of an optical pickup which has been conventionally used.

DESCRIPTION OF THE PREFERRED EMBODIMENTS

Figure 1:
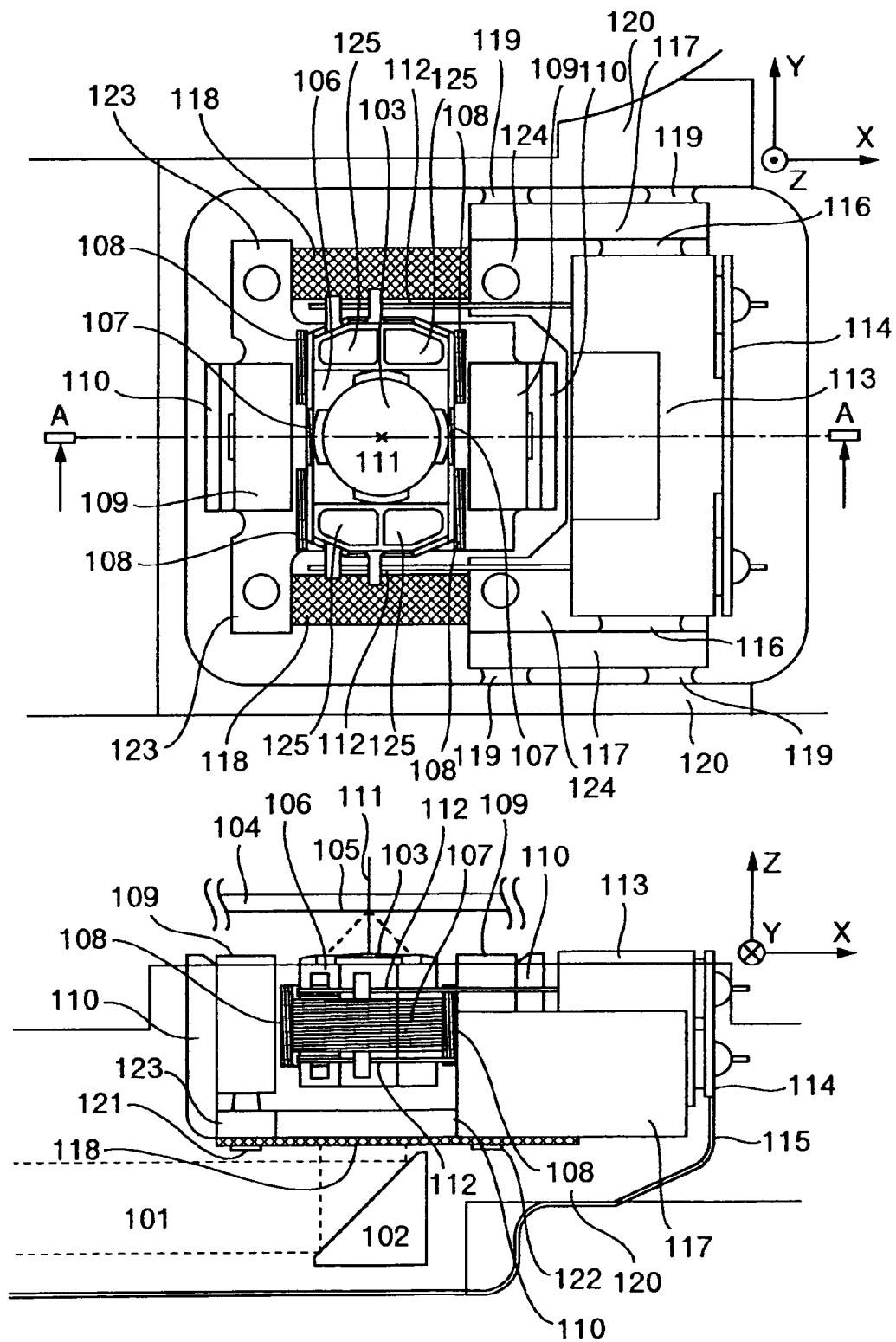
FIG. 1 is a top elevational view showing a whole structure of an optical pickup provided with a first operation sound restricting structure and a perspective view from a side surface.
Figure 2:
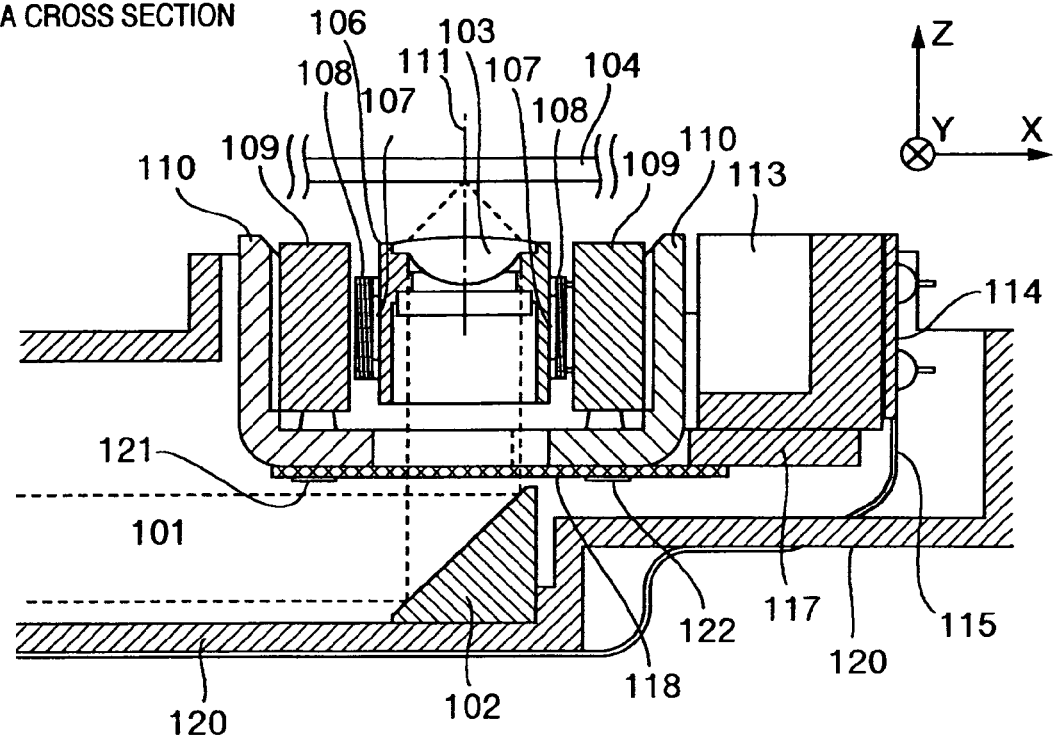
FIG. 2 is a cross sectional view along a line A-A in FIG. 1.
Figure 3:
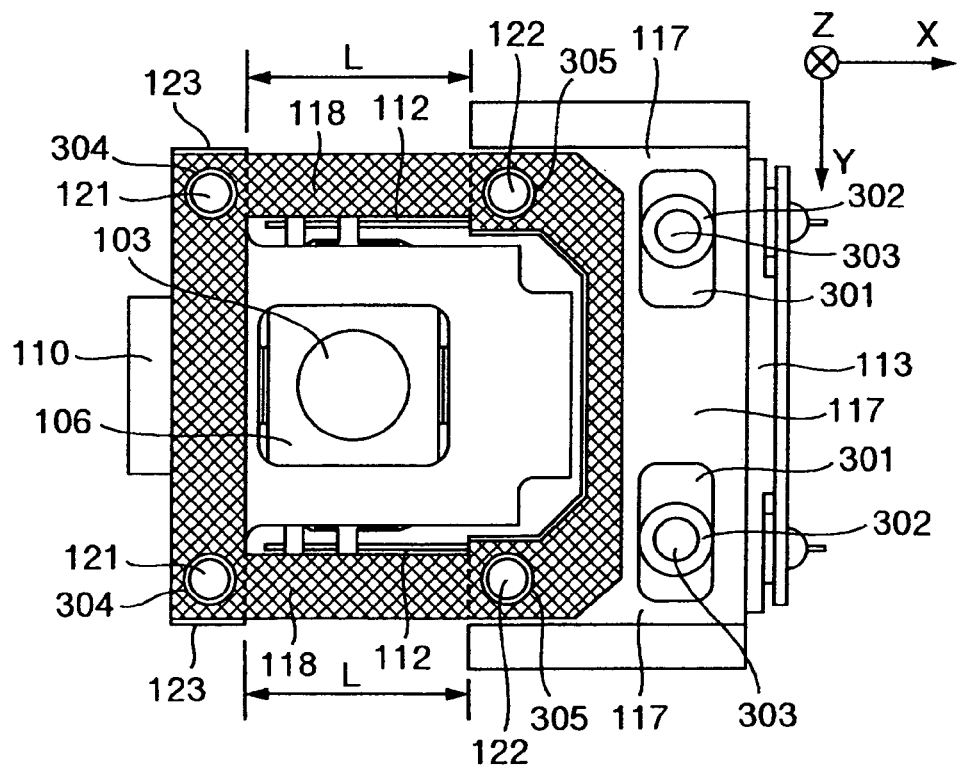
FIG. 3 is a view obtained by seeing FIG. 1 from a back surface.

A description will be given below of an embodiment of an operation sound restricting optical pickup in accordance with the present invention with reference to the accompanying drawings. At first, a description will be given of an embodiment of a first operation sound restricting structure with reference to FIGS. 1 to 10. FIGS. 1 to 3 shows a whole structure of an optical pickup provided with the first operation sound restricting structure, in which FIG. 1 shows a top elevational view in an upper stage and a perspective view from a side surface in a lower stage, FIG. 2 shows a cross sectional view along a line A-A in FIG. 1, and FIG. 3 shows a view obtained by seeing from a back surface.

In FIG. 1, a light beam 101 emitted from a laser light source (not shown) and passing through an optical part such as a collimate lens (not shown) or the like enters into an objective lens 103 after being perpendicularly stood up by a prism 102, and is focused on an information recording surface 105 of a disc-like recording medium 104 opposing to the objective lens 103 with a predetermined interval. The light beam (not shown) reflected on the information recording medium 105 passes through the objective lens 103 and the prism 102, and enters into an optical detector (not shown) so as to be converted into an electric signal, whereby an information on the disc-like recording medium surface 105 is reproduced. The objective lens 103 is mounted to a center portion of a lens holder 106 formed by an engineering plastic material such as PPS resin, LCP resin or the like, a focus coil 107 to which a coil winding is applied by a copper wire or the like is mounted on an outer peripheral side surface of the lens holder 106, and four tracking coils 108 to which a coil winding is applied by a copper wire or the like are mounted on an outer side surface of the focus coil 107 at substantially longitudinally and laterally symmetrical positions with respect to the objective lens 103. Further, a hole 125 is pierced in the lens holder 106 partway in a direction −Z in the drawing for weight saving. Rectangular parallelepiped magnets 109 oppose to the focus coil 107 and the tracking coil 108 with a predetermined gap, and these magnets 109 are mounted to a yoke 110 made of a magnetic body such as an iron or the like. In other words, the structure is made such that the focus coil 107, the tracking coil 108, the magnet 109 and the opposing surface of the yoke 110 are respectively arranged substantially point symmetrical positions with respect to an optical axis 111 of the objective lens 103 in a state in which no electric current is applied. One ends of four suspensions 112 are mounted to right and left side surfaces of the lens holder 106 by means of an adhesive bonding or the like, and the one end of four suspensions 112 are electrically connected to the focus coil 107 and the tracking coil 108 by means of a soldering or the like. These suspensions 112 are constituted by a rod-like narrow metal wire, for example, made of phosphor bronze, beryllium copper or the like, and have a circular or rectangular cross section. The suspensions 112 passes through an inner portion of a suspension holder 113, and another ends thereof are mounted to a connection base plate 114 mounted to the suspension holder 113 by means of a soldering or the like. A flexible print cable 115 is connected to the connection base plate 114, and this flexible print cable 115 is electrically connected to a drive circuit (not shown). A silicone type damping member (not shown) is charged in an inner portion of the suspension holder 113 so as to surround four suspensions 112, and right and left side surfaces of the suspension holder 113 are fixed to a unit base 117 by an adhesive bonding member 116. In the unit base 117, elongate holes 301 having a flat center portion and extending in a Y direction in the drawing are pierced, and the unit base 117 forms a mounting surface of the suspension holder 113. Further, the right and left side surface portions are substantially perpendicularly (in a direction Z) bent with respect to the center portion, and are formed in a substantially recess shape as seen from a direction +X. The unit base 117 is connected to the yoke 110 via a spring member 118 (shown by a hatched portion), and is fixed to a casing 120 by an adhesive bonding member 119. Boss portions 302 protruding in a direction −Z in the drawing are provided in right and left sides of a lower surface of the suspension holder 113, and hole portions 303 pierced partway in the direction +Z are provided in inner portions of the bosses 302. In a state in which the oblong hole 301 and the boss portion 302 are fitted, the suspension holder 113 is structured such that a position in a direction X in the drawing is restricted, and a parallel movement in a direction Y in the drawing with respect to the unit base 117 can be executed. In accordance with this structure, a relative position between the yoke 110 and the magnet 109 which are connected via the unit base 117 and the spring member 118, and the focus coil 107 which is connected via the suspension 112 can be adjusted, whereby it is possible to restrict a moment generated at a time when the lens holder 106 operates in the direction Z, by extension an incline of the objective lens 103. In order to execute this adjustment, a position in the direction Y in the drawing is adjusted by fixing the unit base 117 by an exclusive jig (not shown) and catching the suspension holder 113 from an external portion by an exclusive jig (not shown) with using the hole portion 303 provided in the inner portion of the boss portion 302. After the adjustment is finished, the right and left side surfaces of the suspension holder 113 are fixed to the unit base 117 by the adhesive bonding member 116. Here, a description will be given below of the spring member 118. The spring members 118 are connected to the yoke 110 by connection portions 121 which exist at positions apart from the optical axis 111 of the objective lens 103 in the direction X in the drawing, and exist at substantially laterally symmetrical positions with respect to the objective lens 103 in the direction Y in the drawing. On the contrary, the spring members 118 are connected to the unit base 117 by connection portions 122 which exist at substantially laterally symmetrical positions with respect to the objective lens 103 in the direction Y in the drawing. The spring member 118 is manufactured by applying a press molding to one sheet of thin metal plate made of a metal material, for example, a stainless steel, a phosphor bronze or the like, in which peripheral portions are connected, a position accuracy such as a parallelism or the like is secured and a torsion or the like is restricted. In this case, the connection portion 121 is formed by extruding in the direction −Z from a bottom surface portion 123 of the yoke 110, and the connection portion 122 is formed by extruding in the direction −Z from a bottom portion 124 of the unit base 117. Further, a hole portion 304 is provided in a side of the yoke 110 of the spring member 118, and a hole portion 305 is provided in a side of the unit base of the spring member 118. The connection portions 121, the hole portions 304, the connection portions 122 and the hole portions 305 are fitted, whereby the yoke 110 is positioned with respect to the unit base 117. A method of connecting the spring members 118, the yoke 110 and the unit base 117 can employ a fastening means, for example, a caulking process, a spot welding or the like, or an adhesive bonding may be employed. In the caulking process, it is possible to further improve an attitude accuracy by adding a redressing operation so as to stabilize the attitude of the yoke 110 with respect to the unit base 117 by using an exclusive jig (not shown) after executing the caulking process. The spring members 118 connected in the manner mentioned above are arranged at positions at which longitudinal directions (direction X) as seen from all of upper surfaces, side surfaces and back surfaces are substantially in parallel to the suspensions 112. In the spring member 118, a portion shown by a distance L in the direction X in the drawing corresponds to a portion functioning as a spring, and has a deformation freedom in a direction of an optical axis 111 of the objective lens 103. In this case, on the assumption that a primary specific frequency of the objective lens 103 in a direction of the optical axis 111 in a vibration system comprising the magnet 109, the yoke 110 and the spring member 118 is f1, and a minimum order specific frequency of the casing 120 is F1, in combination with parameters of Young's modulus of the material, a thickness and a width, the size L of the spring member 118 is set so that an upper limit value of f1 mentioned above is equal to or less than $1/\sqrt{2}$ times of F1 mentioned above. Further, although an illustration is omitted, on the assumption that a primary specific frequency of a vibration proofing leg supporting a chassis to which the optical pickup in accordance with the present embodiment is mounted in the direction of the optical axis 111 is F2, it is set so that a lower limit value of f1 mentioned above is equal to or more than $\sqrt{2}$ times of F2 mentioned above.

FIG. 4 shows another embodiment of a connection among the unit base 117, the yoke 110 and the spring member 118 shown in FIGS. 1 to 3. In the present embodiment, as described with reference to FIGS. 1 to 3, the connection portion 121, the hole portion 303, the connection portion 122 and the hole portion 304 are fitted so as to position the yoke 110 with respect to the unit base 117, and connected by the fastening means, for example, the caulking process, the spot welding or the like, and in addition thereto, a hole 401 is provided beside the hole portion 304 fitted to the connection portion 121 and a hole 402 is provided beside the hole portion 305 fitted to the connection portion 122, in the spring member 118, and an adhesive bonding member 403 is injected from the holes 401 and 402. Since a contact surface between the spring member 118 and the yoke 110, and a contact surface between the spring member 118 and the unit base 117 do not completely coincide with each other and a gap is partly generated, the adhesive bonding member 403 is inserted into the gap so as to be cured. As mentioned above, the adhesive bonding is added to the fastening means such as the caulking process, the spot welding or the like, thereby connecting. In this case, since the adhesive bonding member 403 is inserted into the gap of the contact surface so as to be cured, it is necessary that the adhesive bonding member 403 has a small viscosity and is cured in accordance with an anaerobic curing or a thermal curing. Further, there can be employed a method of inserting the adhesive bonding member 403 into any one of the surface with which the spring member 118 and the yoke 110 are in contact, and the surface with which the spring member 118 and the unit base 117 are in contact, and curing. By adding the adhesive bonding, it is possible to make the vibration state of the spring member 118 further stable.

Figure 5:
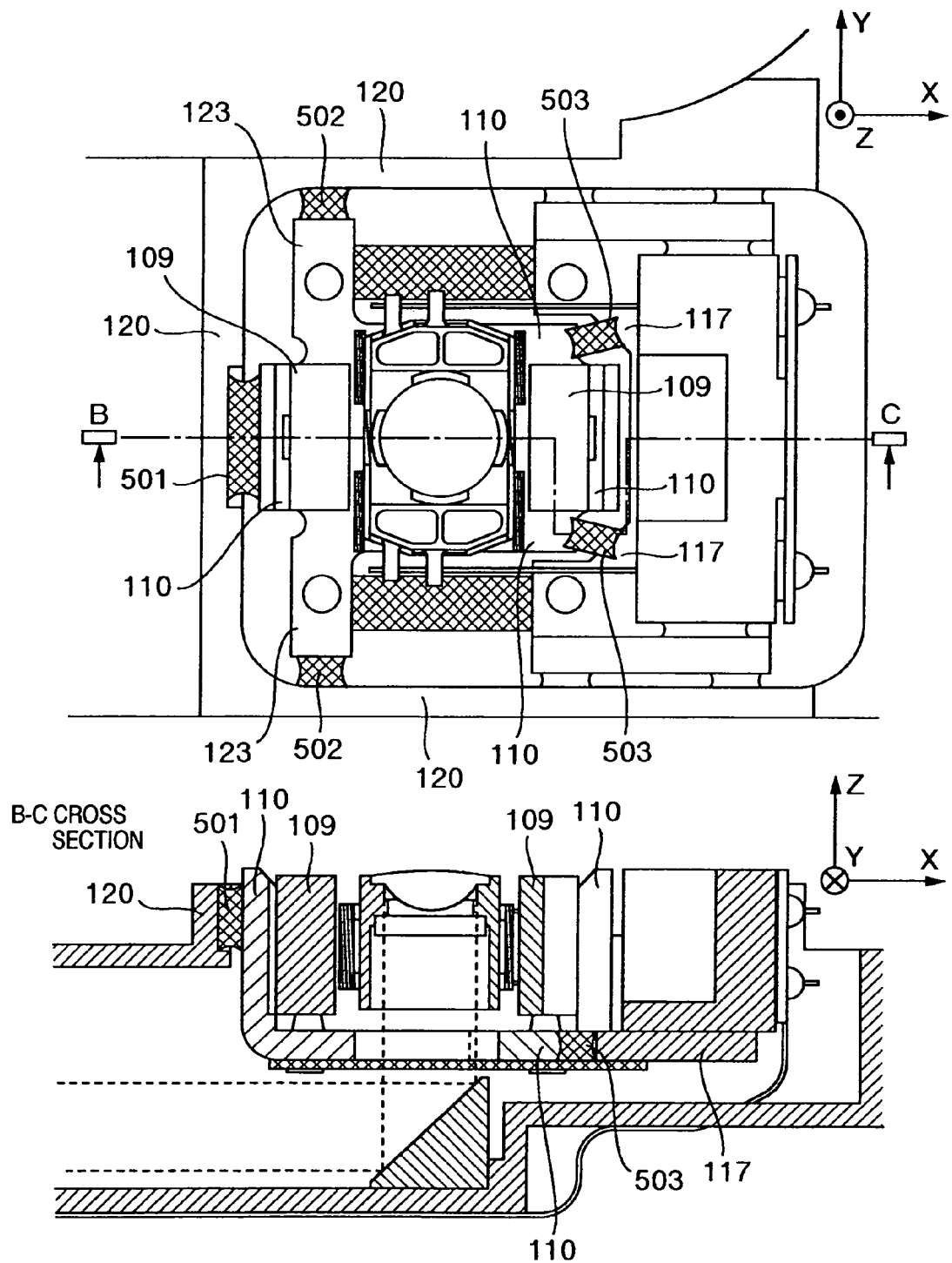
FIG. 5 is a view showing an embodiment in which a damping is applied to a vibration system comprising the spring member 118, the yoke 110 and a magnet 109 shown in FIGS. 1 to 3.

FIGS. 5 and 6 show an embodiment in which a damping operation is applied to the vibration system comprising the spring member 118, the yoke 110 and the magnet 109 shown in FIGS. 1 to 3. In FIG. 5, there is described an embodiment in which a damping operation is applied to the yoke 110 mentioned above. In this drawing, a first application portion has a structure in which a silicone type resin member 501 is charged into a space gripped by the yoke 110 and the casing 120, and a silicone type resin member 502 is charged into a space gripped by the bottom surface 123 of the yoke 110 and the casing 120. In this case, the structure may be made such that any one of the silicone type resins 501 and 502 is charged. A second application portion has a structure in which a silicone type resin 503 is charged into a space gripped by the yoke 110 and the unit base 117. It is possible to employ both or any one of the first application portion and the second application portion. In this case, a material, a charging volume, a contact area between the yoke 110 and the casing 120, a contact area between the yoke 110 and the unit base 117 and the like of the silicone type resin members 501, 502 and 503 are set in correspondence to a required damping performance. Further, a rigidity of the silicone type resin members 501, 502 and 503 is set so that the primary specific frequency f1 in the direction of the optical axis 111 of the objective lens 103 is within a required range. In FIG. 6, there is described an embodiment in which the damping operation is applied to the spring member 118. In this drawing, a hole 601 is pierced on the bottom surface 124 of the unit base 117 at a position in a direction −X forward from the connection portion 122, the spring member 118 is visible through the hole 601 as seen from an upper surface, and a space in a direction Z is provided between the bottom surface 124 of the unit base 117 and the spring member 118 as seen from a side surface. When charging a silicone type resin 602 from a direction +Y in the above, the silicone type resin 602 is charged into the space mentioned above. In this case, a material, a charging volume, a contact area with the spring member 118, in this case, particularly a distance in the direction X, and the like of the silicone type resin member 602 are set in accordance with a required damping performance. Further, a rigidity of the silicone type resin member 602 is set so that the primary specific vibration f1 in the direction of the optical axis 111 of the objective lens 103 is within a required range.

A description will be given of a structure of the yoke 110 shown in FIGS. 1 to 3 and an adhesive bonding structure of the magnet 109. In FIG. 7, the yoke 110 is constituted by a first yoke 701 having a predetermined thickness in a direction substantially parallel to an XY plane in the drawing, and a second yoke 702 bent substantially perpendicular to the first yoke 701 (substantially parallel to a YZ plane in the drawing) and having a predetermined thickness. A hole 705 is pierced in a center portion of the first yoke 701 so as to pass the light beam 101 therethrough. The magnet 109 is mounted to the second yoke 702, and is struck against a projection portion 706 formed by extruding in the direction +Z from the first yoke 701, thereby being positioned in the direction Z. A groove portion 703 is provided in the direction Z in the drawing in the second yoke 702, and a taper portion 704 is formed at a front-end portion thereof. When inserting an adhesive bonding member 707 into the second yoke 702 from the above, the adhesive bonding member 707 is stored in a substantially V-shaped space gripped between the taper portion 704 and the magnet 109, and the adhesive bonding member 707 flows into the groove portion 703 through the taper portion 704. When curing in this state, the magnet 109 is firmly bonded to the second yoke 702. In this case, since the adhesive bonding member 707 is inserted into all the surface of the groove portion 703 and cured, it is necessary to have a small viscosity and be cured in accordance with an anaerobic curing or a thermal curing. FIG. 8 shows another embodiment, which is different from the embodiment in FIG. 7 with respect to the structure of the yoke 110, and the adhesive bonding structure of the magnet 109. A taper portion 801 is formed all around the direction Z on right and left side surfaces of the second yoke 702, and an adhesive bonding member 803 is charged into at least one end of the second yoke 702 and portions close to another end, totally eight portions form the side surface. When curing in this state, the magnet 109 is firmly bonded to the second yoke 702. In this case, the adhesive bonding member 803 can, of course, employ the adhesive material which has a small viscosity in the same manner as that described with respect to FIG. 7 and is cured in accordance with the anaerobic curing or the thermal curing, and can also employ an adhesive material which has a larger viscosity and is cured in accordance with an ultraviolet curing.

Figure 9:
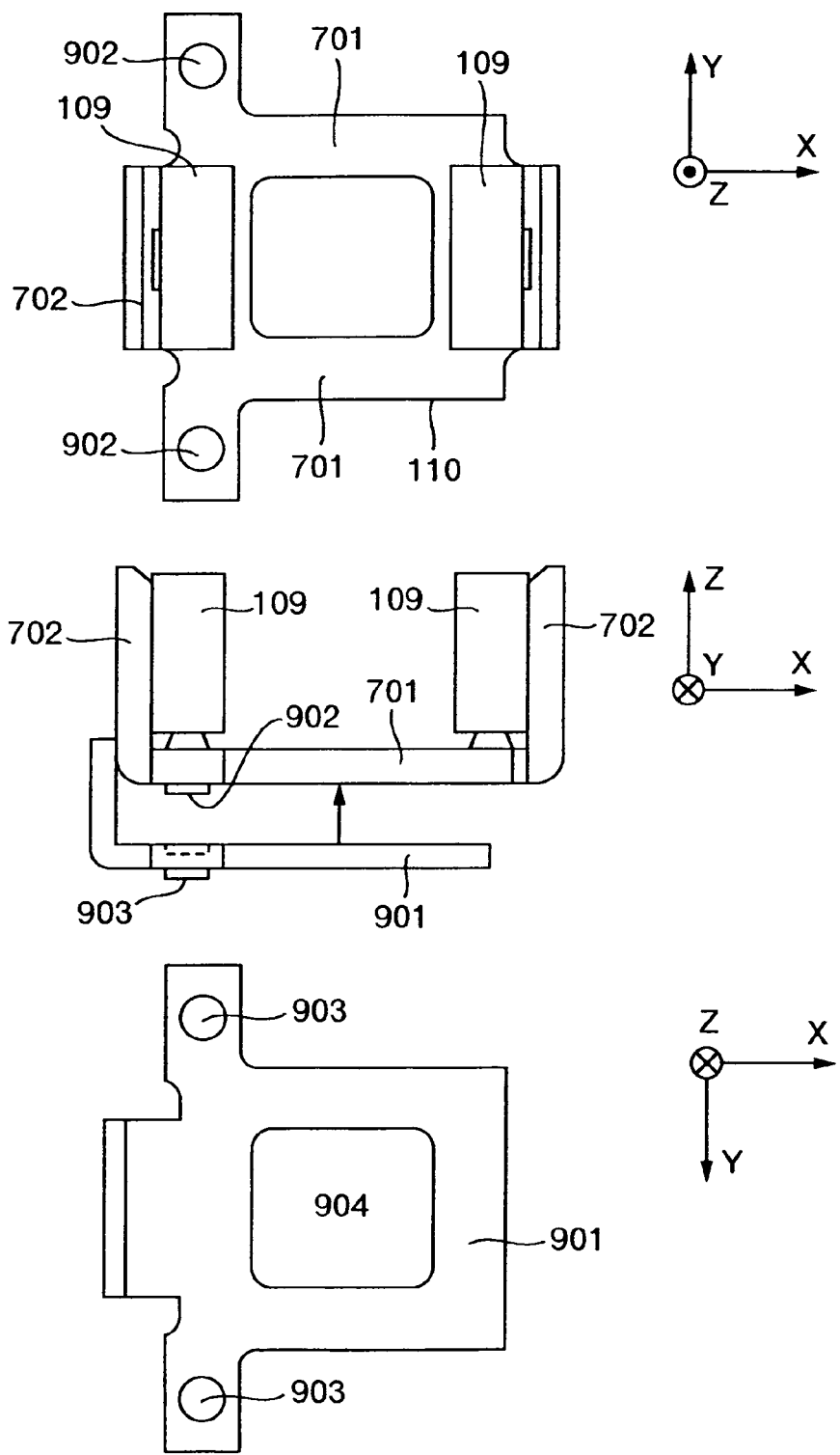
FIG. 9 is a view describing another embodiment different from the structure of the yoke 110 described in FIG. 7.

FIG. 9 shows the other embodiment, which is different from the structure of the yoke 110, described in FIGS. 7 and 8. In the present embodiment, as shown in a middle stage of this drawing, the structure is made such that an independent member 901 is mounted to the first yoke 701 from a direction −Z, thereby being reinforced. The independent member 901 is formed in a shape as shown in a lower stage as seen from a back surface (a direction −Z), a hole 904 is pierced in a center portion for passing the light beam 101 therethrough, and a projection portion 903 formed by extruding in the direction −Z is formed for connecting to the spring member 118. Further, a projection portion 902 formed by extruding in the direction −Z is formed in the first yoke 701, and a position of the independent member 901 is determined by fitting between the projection portion 902 and a hole portion (not shown) formed on an opposite surface of the projection portion 903 in the independent member 901. Further, it is possible to adhere between the first yoke 701 and the independent member 901.

FIG. 10 shows the other embodiment of the spring member 118, and in a spring member 1001 in accordance with the present embodiment, hole portions 1002 are pierced in front and rear portions of the plate, and right and left bent portions 1003 bent in a direction −Z are formed in a center portion. In the spring member 1001 mentioned above, the bent portions 1003 operate as a rigid body, and spring portions 1004 existing in right and left portions of the hole portions 1002 correspond to a portion functioning as a spring, thereby obtaining a deformation freedom of the objective lens 103 in the direction of the optical axis 111 (the direction Z in the present drawing). The other structures are the same as those of the embodiment described with reference to FIGS. 1 to 3, and a description thereof will be omitted. FIG. 11 shows further the other embodiment of the spring member 118. A spring member 1101 in accordance with the present embodiment is constituted by upper and lower spring portions 1102 and 1103 arranged in parallel as seen from a side surface, a connection portion 1104 for connecting to the bottom surface 123 of the yoke 110 and a connection portion 1105 for connecting to the bottom surface 124 of the unit base 117, the connection portions 1104 and 1105 being formed in front and rear portions of the spring portions 1102 and 1103. These elements are integrally manufactured, for example, in accordance with a press molding. In the spring member 1101 mentioned above, the spring members 1102 and 1103 correspond to a portion functioning as a spring, thereby obtaining a deformation freedom of the objective lens 103 in the direction of the optical axis 111 (the direction Z in this drawing). The other structures as the same as those of the embodiment described with reference to FIGS. 1 to 3, and a description thereof will be omitted.

Thus, the description is mainly given of the internal structure of the casing 120 mentioned above, however, a description will be given of a structure of the casing 120 mentioned above with reference to FIGS. 12 and 13. FIG. 12 shows a top elevational view and a side elevational view, and FIG. 13 shows a cross sectional view along a line A-A and a back elevational view. The unit base 117, the lens holder 106 supported to the unit base 117 via the suspensions 112, the yoke 110 connected via the spring member 118, the magnet 109 and the like which are previously described are arranged in a space surrounded by a dotted line 1201. Further, an optical system such as a laser light source (not shown), a collimate lens (not shown), an optical detector (not shown) and the like is arranged in a space surrounded by a dotted line 1202. A periphery of the space surrounded by the dotted line 1201 is a closed structure surrounded by a bottom plate portion 1203, left and right side wall portions 1204 and 1205 connected to the bottom plate portion 1203 and formed in a perpendicular direction, and front and rear side wall portions 1206 and 1207. In this case, a hole 1208 is pierced in a part of the bottom plate portion 1203, and this hole 1208 is provided for passing the flexible print cable 115 therethrough and charging the adhesive bonding member 119 from a back surface so as to fix the unit base 117 to the left and right side wall portions 1204 and 1205 of the casing 120. The disc-like recording medium 104 opposes to an upper surface portion 1209, and a cover (not shown) is mounted so as to cover the portions except the objective lens 103 in the space surrounded by the dotted line 1201. Further, the space surrounded by the dotted line 1202 is made in a closed structure in which a periphery is surrounded by a bottom plate portion 1210, front and rear side wall portions 1211 and 1212 and left and right side wall portions 1213 and 1214 which are connected to the bottom plate portion 1210 and perpendicularly formed, and a cover (not shown) is mounted to an upper surface portion 1215. As mentioned above, a whole of the casing 120 is made in the closed structure surrounded by the bottom plate portion, the front and rear side wall portions and the left and right side wall portions which are connected to the bottom plate portion and perpendicularly formed. Guide bar bearing portions 1216 and 1217 (not shown) provided for the purpose of moving the whole of the casing 120 in a radial direction of the disc-like recording medium 104 are formed in a front-end portion and a rear end portion of the casing 120. As a material for the casing 120, for example, an aluminum die casting material, a zinc die casting material or an aluminum and zinc mixed die casting material or the like can be employed.

Figure 14:
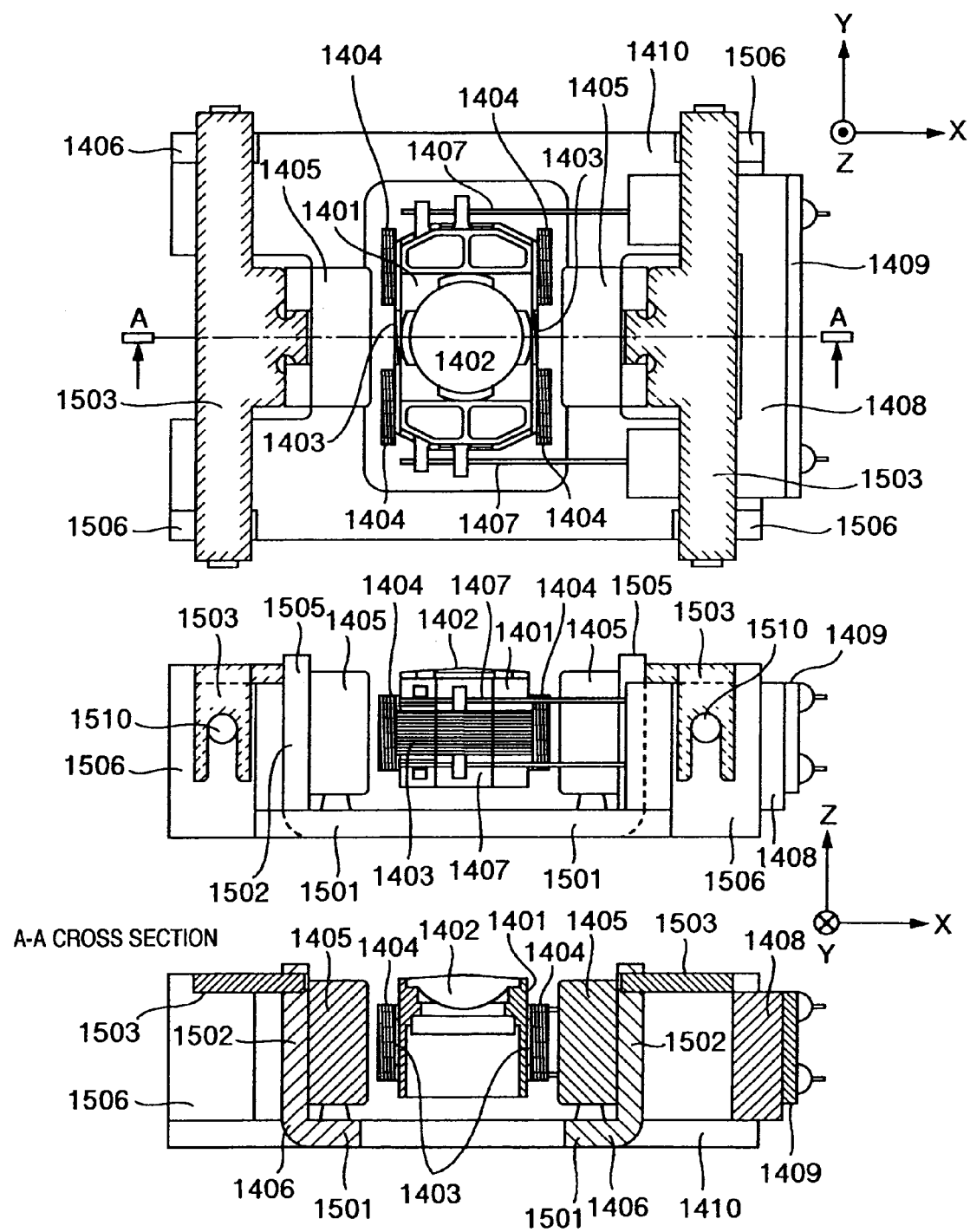
FIG. 14 is a top elevational view, a side elevational view and a cross sectional view along a line A-A showing an embodiment of a second operation sound restricting structure.

Next, a description will be given below of a second operation sound restricting structure with reference to FIGS. 14 to 20. FIG. 14 is a top elevational view, a side elevational view and a cross sectional view along a line A-A showing an embodiment of a second operation sound restricting structure. In this drawing, reference numeral 1401 denotes a lens holder formed by an engineering plastic such as a PPS resin, an LCP resin or the like. An objective lens 1402 is mounted to a center portion of the lens holder 1401. A focus coil 1403 is wound around an outer side surface of the lens holder 1401 so as to surround the objective lens 1402, and four tracking coils 1404 are adhesive fixed to the outer side surface of the focus coil 1403 at positions longitudinally and laterally symmetrical to the objective lens 1402. Two magnets 1405 are opposed to the focus coil 1403 and the tracking coil 1404 at a predetermined interval, and these magnets 1405 are mounted to a yoke portion 1406. One ends of four suspensions 1407 constituted by a narrow metal wire, for example, made of phosphor bronze, beryllium copper or the like and having a circular or rectangular cross section are mounted to right and left side surfaces of the lens holder 1401 by means of an adhesive bonding or the like, and are in a state of being electrically connected to the focus coil 1403 and the tracking coil 1404 by means of a soldering or the like. Further, another ends of the suspensions 1407 are mounted to a base plate 1409 mounted to the suspension holder 1408 by means of a soldering or the like, and the base plate 1409 is electrically connected to a drive circuit (not shown) through an FPC (not shown). A damping member (not shown) is charged in an inner portion of the suspension holder 1408 so as to surround four suspensions 1407, and the suspension holder 1408 is fixed to a unit base 1410 by means of an adhesive bonding or the like. The unit base 1410 is integrally formed with the yoke portion 1406 in accordance with a press molding or the like, and is fixed to a casing of an optical pickup (not shown) by means of an adhesive bonding or the like after predetermined position and attitude are determined with respect to an optical system provided in the casing of the optical pickup. In this state, the lens holder 1401 including the objective lens 1402 is supported so as to move in parallel in a surface vibration direction (a direction Z of this drawing) and a radial direction (in a direction Y of this drawing) of the optical disc, and when applying an electric current to the focus coil 1403 and the tracking coil 1404 so as to control, a thrust due to an electromagnetic force is applied and the lens holder 1401 holding the objective lens 1402 is driven in the focus direction (the direction Z of this drawing) or the tracking direction (the direction Y of this drawing). In this case, in order to easily understand the embodiment in accordance with the present invention, a description will be given below with reference to FIG. 15 which shows by extracting a main portion from FIG. 14.

In FIG. 15, the yoke portion 1406 is constituted by a first yoke 1501 which is substantially in parallel (a direction X of this drawing) to an optical disc (not shown) and has a predetermined thickness, and a second yoke 1502 which is bent substantially perpendicular (a direction Z of this drawing) to the first yoke 1501 so that one end is connected to the first yoke 1501 and another end is opposed to an optical disc (not shown) and has a predetermined thickness, and the magnet 1405 is mounted along the second yoke 1502. A vibration restricting member 1503 is arranged in an outer side of the first yoke 1501 and the second yoke 1502, one end 1504 of the vibration restricting member 1503 is in contact with a portion close to a front end portion 1505 of the second yoke 1502 from a direction of an arrow 1512 in the drawing (a direction X), and another end 1509 thereof is fixed to vibration restricting member mounting portions 1406 formed in front, rear, right and left portions of the unit base 1410 by means of an adhesive bonding or the like. In accordance with the structure mentioned above, in the front-end portion 1505 of the second yoke 1502, a vibration displacement around a Y axis is restricted. In this case, a protruding portion 1507 extending from one end 1504 is formed in the vibration restricting member 1503, a recess portion 1508 is formed in the front end portion 1505 of the second yoke 1502, and the protruding portion 1507 is fitted to the recess portion 1508, whereby a position of one end 1504 in the vibration restricting member 1503 is easily determined with respect to the front end portion 1505 of the second yoke 1502. Further, a positioning pin 1510 protruding in the Y direction of the drawing is formed in a vibration restricting member mounting portion 1506, an oblong hole portion 1511 is formed in another end 1509 of the vibration restricting member 1503, and the oblong hole portion 1511 is fitted to the positioning pin 1510, whereby a position of another end 1509 of the vibration restricting member 1503 is easily determined with respect to the vibration restricting member mounting portion 1506. A left member of the vibration restricting member 1503 is rotated around the positioning pin 1510 in a clockwise direction and a right member of the vibration restricting member 1503 is rotated around the positioning pin 1510 in a counterclockwise direction, thereafter, the vibration restricting member 1503 is fixed to the vibration restricting member mounting portion 1506. In the manner mentioned above, one end 1504 of the vibration restricting member 1503 is in contact with the front end portion 1505 of the second yoke 1502 in a state that an energizing force is applied in a direction of an arrow 1512 (a direction X) of the drawing. The vibration restricting member 1503 can employ, for example, a brass, an iron or the like which has a high rigidity and is inexpensive, and can be manufactured by integrally forming with using a press molding or the like. In this case, a shape of the vibration restricting member 1503 is not limited to a shape of the present embodiment, and any shape may be employed as far as a shape can be in contact with the front end portion 1505 of the second yoke 1502 from the direction of the arrow 1512 of the drawing (the direction X) and can be mounted to the vibration restricting member mounting portion 1506, and it is possible to timely deform within a mounting space.

A description will be given below of the other embodiments, however, in order to easily understand, a description will be given by using drawings obtained by extracting a main portion in the same manner as FIG. 15. In this case, the other portions are the same as FIG. 14.

Figure 16:
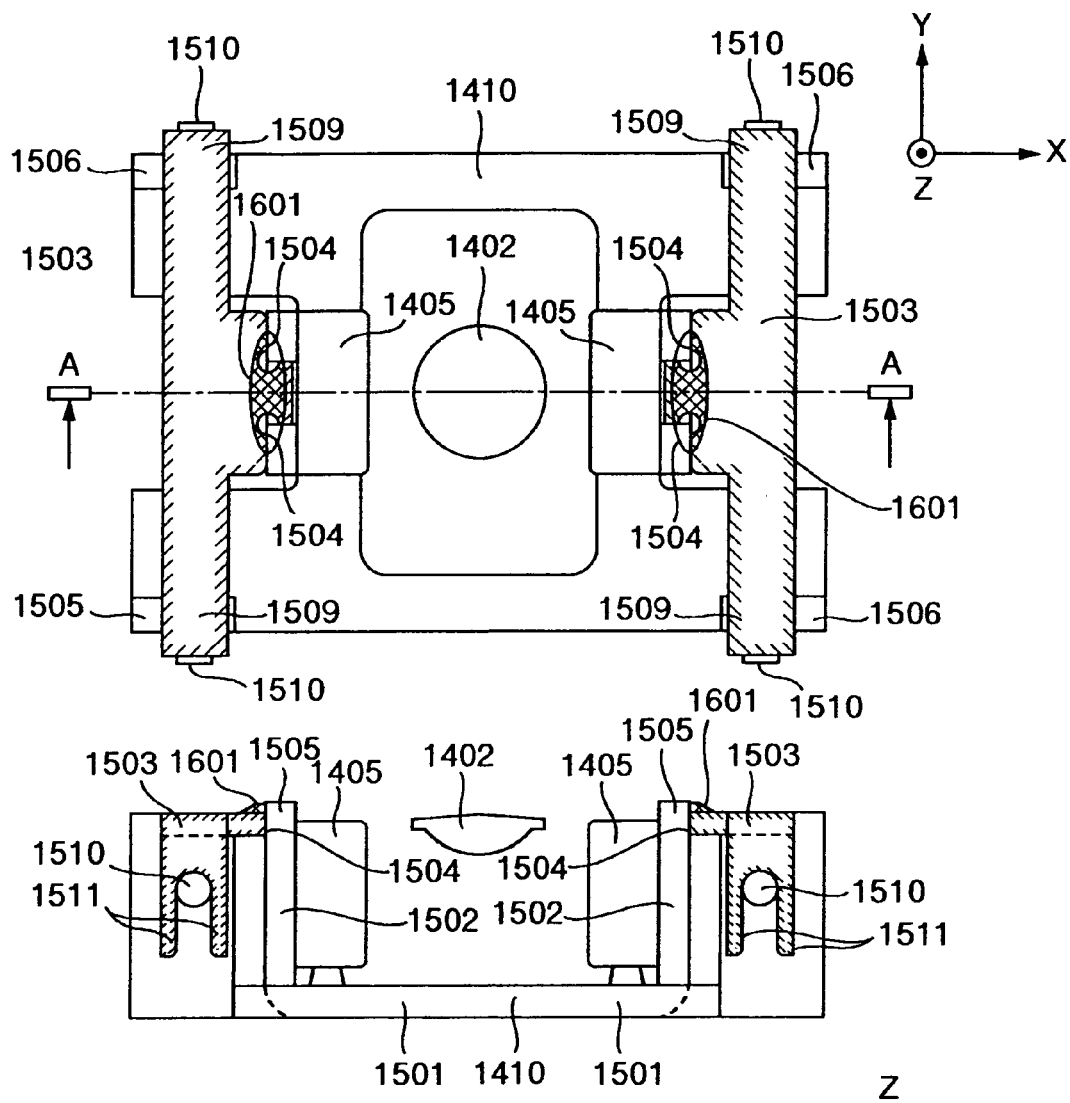
FIG. 16 is a view showing another embodiment in the second operation sound restricting structure.

FIG. 16 shows the other embodiment in the second operation sound restricting structure. In the present embodiment, the vibration restricting member 1503 is arranged in an outer side of the first yoke 1501 and the second yoke 1502, and the vibration restricting member 1503 is structured such that one end 1504 extends toward the front end portion 1505 of the second yoke 1502 from the direction X of the drawing. In this state, one end 1504 of the vibration restricting member 1503 and the front end portion 1505 of the second yoke 1502 are connected by an adhesive agent 1601. By employing the structure mentioned above, in the front-end portion 1505 of the second yoke 1502, a vibration around the Y axis in the drawing is restricted. Since the other is the same as the embodiment described with reference to FIGS. 14 and 15, a description thereof will be omitted.

FIG. 17 shows further the other embodiment in the second operation sound restricting structure. In the present embodiment, a vibration restricting member 1701 is arranged in outer sides of the first yoke 1501 and the second yoke 1502, and a damping member 1702 is inserted between the vibration restricting member 1701 and the front end portion 1505 of the second yoke 1502 toward a direction of an arrow 1512 (a direction X) of the drawing. The damping member 1702 is in contact with the front end portion 1505 of the second yoke 1502 in a state that an energizing force is applied in the direction X of the drawing, and a damping rubber, an adhesive agent having a damping property or the like can be employed as the damping member 1702. By employing the structure mentioned above, in the front-end portion 1505 of the second yoke 1502, a vibration displacement around the Y axis of the drawing is restricted. Since the other structures are the same as the embodiment described with reference to FIGS. 14 and 15, a description thereof will be omitted here.

FIG. 18 shows further the other embodiment in the second operation sound restricting structure. In the embodiment mentioned above, the structure is made such that the vibration restricting member 1503 provided in the outer side of the second yoke 1502 is separated into right and left, however, in the present embodiment, these are integrally formed so as to constituted a vibration restricting member 1801, and another end 1802 thereof is fixed to the vibration restricting member mounting portions 1506 formed in front, rear, right and left of the unit base 1410 by means of an adhesive bonding or the like. In this case, there is shown the embodiment obtained by modifying the embodiment in FIG. 15, however, it is possible to employ a structure obtained by modifying the embodiments in FIGS. 15, 16 and 17. Since the other structures are the same as the embodiment described with reference to FIGS. 14 and 15, a description thereof will be omitted here.

FIG. 19 shows further the other embodiment in the second operation sound restricting structure. In this drawing, a casing 1901 of an optical pickup and an optical system 1902 are simultaneously shown. In the present embodiment, in addition to the embodiment in FIG. 18, the structure is made such that another end 1904 of an integrally formed vibration restricting member 1903 is fixed to the casing 1901 of the optical pickup in place of the unit base 1410, whereby the vibration restricting member 1903 also functions as a cover of the casing 1901 of the optical pickup. Since the other structures are the same as the embodiment described with reference to FIGS. 14 and 15, a description thereof will be omitted here.

FIG. 20 is an embodiment showing a method of fixing the magnet 1405 mounted along the second yoke 1502, in the second operation sound restricting structure. The magnet 1405 mentioned above is connected to the portion close to the front end portion 1505 of the second yoke 1502 by an adhesive agent 2001, with respect to a vertical direction (a direction Z of the drawing), and is connected to the portion close to the root portion of the second yoke 1502 by an adhesive agent 2002. In the manner mentioned above, the magnets 1405 are adhered to the second yoke 1502 at upper, lower, right and left portions, totally eight points. In this case, there is shown the case of the embodiment described with reference to FIGS. 14 and 15, however, it is possible to apply to the case of the embodiment described with reference to FIGS. 16 to 19.

Next, a description will be given of a third operation sound restricting structure with reference to FIGS. 21 and 22. The third operation sound restricting structure is mainly made such that the contact member mounted to the casing 120 is in contact with the yoke 110, in addition to the first operation sound restricting structure described with reference to FIGS. 1 to 13. FIG. 21 is a top elevational view and a cross sectional view along a line A-A showing an embodiment of the third operation sound restricting structure, in which the yoke 110 and the magnet 109 are connected to the unit base 117 via the spring member 118, and a contact member 2101 is mounted to the casing 120 via a cover 2102, and is in a state of being in contact with the yoke 110 and the magnet 109 from a direction Z of the drawing. For example, a silicone type resin, a damping member or the like may be employed as the contact member 2101. Further, drawn portions 2103 drawn in a direction –Z for the purpose of increasing its own rigidity are provided in right and left portions of the cover 2102, and an opening portion 2104 for irradiating the light beam 101 entering into the objective lens 103 onto the information recording surface 105 of the disc-like recording medium 104 is provided. In this case, in the present embodiment, since the other structures than the contact member 2101, the cover 2102, the drawn portion 2103 and the opening portion 2104 are the same as those in FIGS. 1 to 13, a description thereof will be omitted here. FIG. 22 is a top elevational view and a cross sectional view along a line A-A showing another embodiment of the third operation sound restricting structure, in which the yoke 110 and the magnet 109 are connected to the unit base 117 via the spring member 118, and a contact member 2201 is integrally formed with a cover 2202 so as to be mounted to the casing 120, and is in a state of being in contact with the yoke 110 and the magnet 109 from a direction Z of the drawing. In the cover 2202, drawn portions 2203 drawn in a direction –Z for the purpose of increasing its own rigidity are provided in right and left portions of the cover 2202, and an opening portion 2204 for irradiating the light beam 101 entering into the objective lens 103 onto the information recording surface 105 of the disc-like recording medium 104 is provided. In this case, in the present embodiment, since the other structures than the contact member 2201, the cover 2202, the drawn portion 2203 and the opening portion 2204 are the same as those in FIGS. 1 to 13, a description thereof will be omitted here.

Figure 23:
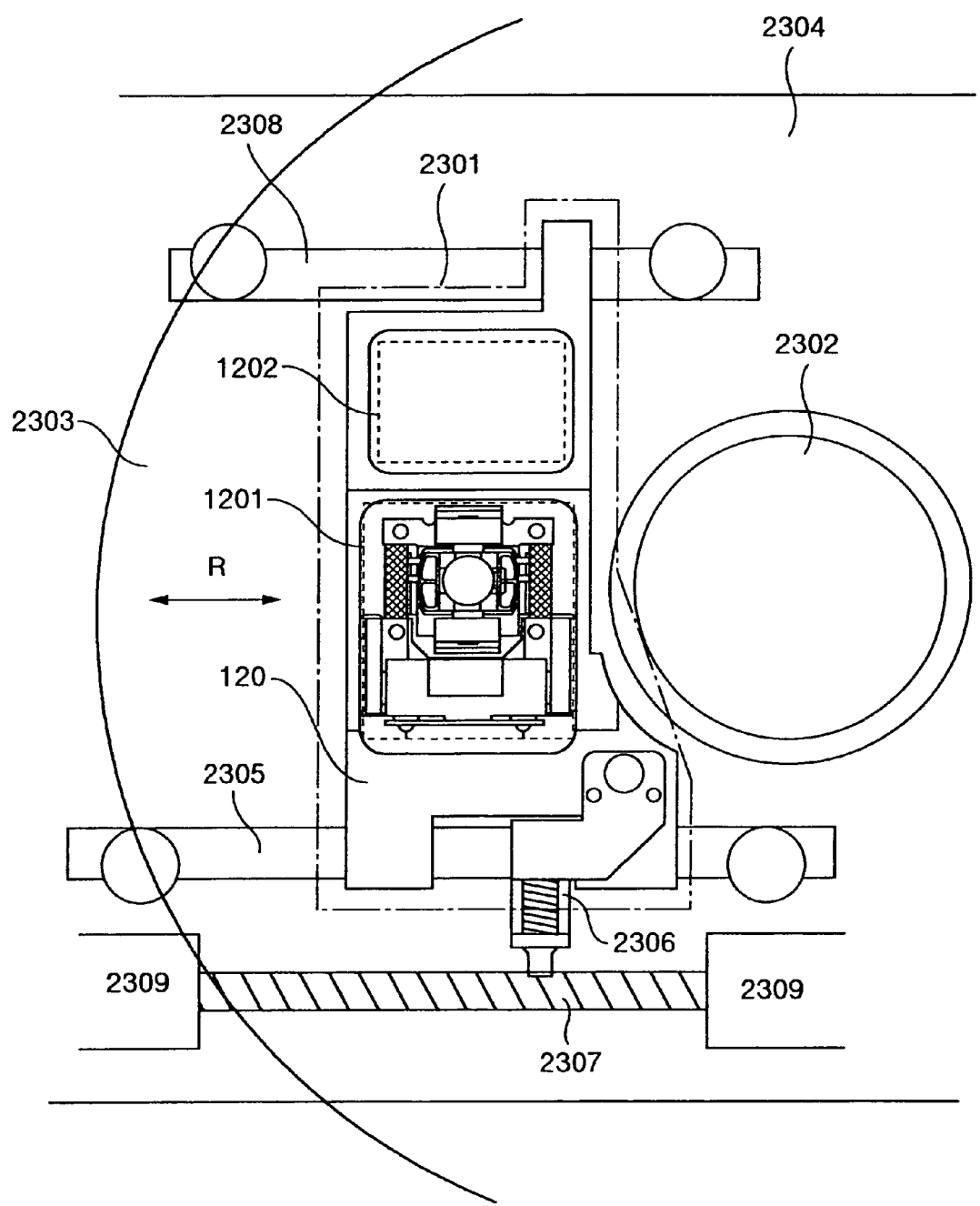
FIG. 23 is a view showing an embodiment of an optical disc apparatus mounting an operation sound restricting optical pickup thereon.

The description has been given above of the embodiments of the first operation sound restricting structure, the second operation sound restricting structure and the third operation sound restricting structure with respect to the operation sound restricting optical pickup, however, a description will be given of embodiments of an optical disc apparatus in which the operation sound restricting optical pickup is mounted with reference to FIGS. 23 and 24. In FIG. 23, a portion surrounded by a one-dot chain line 2301 shows an optical pickup of the first operation sound restricting structure described with reference to FIGS. 1 to 13. In this structure, the unit base 117, the lens holder 106 supported to the unit base 117 via the suspension 112, the yoke 110 connected via the spring member 118, the magnet 109 and the like which are described above are arranged in the portion surrounded by the dotted line 1201, the optical system such as the laser light source (not shown), the collimate lens (not shown), the light detector (not shown) and the like is arranged in the portion surrounded by the dotted line 1202, and the optical pickup 2301 is arranged in a lower surface of an optical disc which is chucked to a disc motor 2302 and rotates. The disc motor 2302 is fixed to a chassis 2304, a main shaft guide bar 2305 is inserted to one end of the optical pickup 2301 and is connected to a feeding screw 2307 via a pressure application portion 2306, a sub shaft guide bar 2308 is held in another end in a state of being inserted, and these guide bars 2305 and 2308 are fixed to the chassis 2304 in accordance with a screwing or the like. The feed screw 2307 is driven by a feed motor 2309 such as a pulse motor or the like, whereby the optical pickup 2301 moves all along a radial direction (a direction R in the drawing) of the optical disc 2303. In this case, a microphone for recording a voice from an external portion is arranged close to the constituting parts described above such as the optical pickup 2301, the optical disc 2303 and the like, which are not illustrated in this drawing, and the constituting parts described above, an electric circuit for feeding signals to them so as to control, and the microphone mentioned above are mounted. In this drawing, there is shown the embodiment in the case of mounting the optical pickup 2301 of the first operation sound restricting structure described with reference to FIGS. 1 to 13, however, it is possible to mount the optical pickup of the second operation sound restricting structure described with reference to FIGS. 14 to 20, or the optical pickup of the third operation sound restricting structure described with reference to FIGS. 21 to 22.

Figure 24:
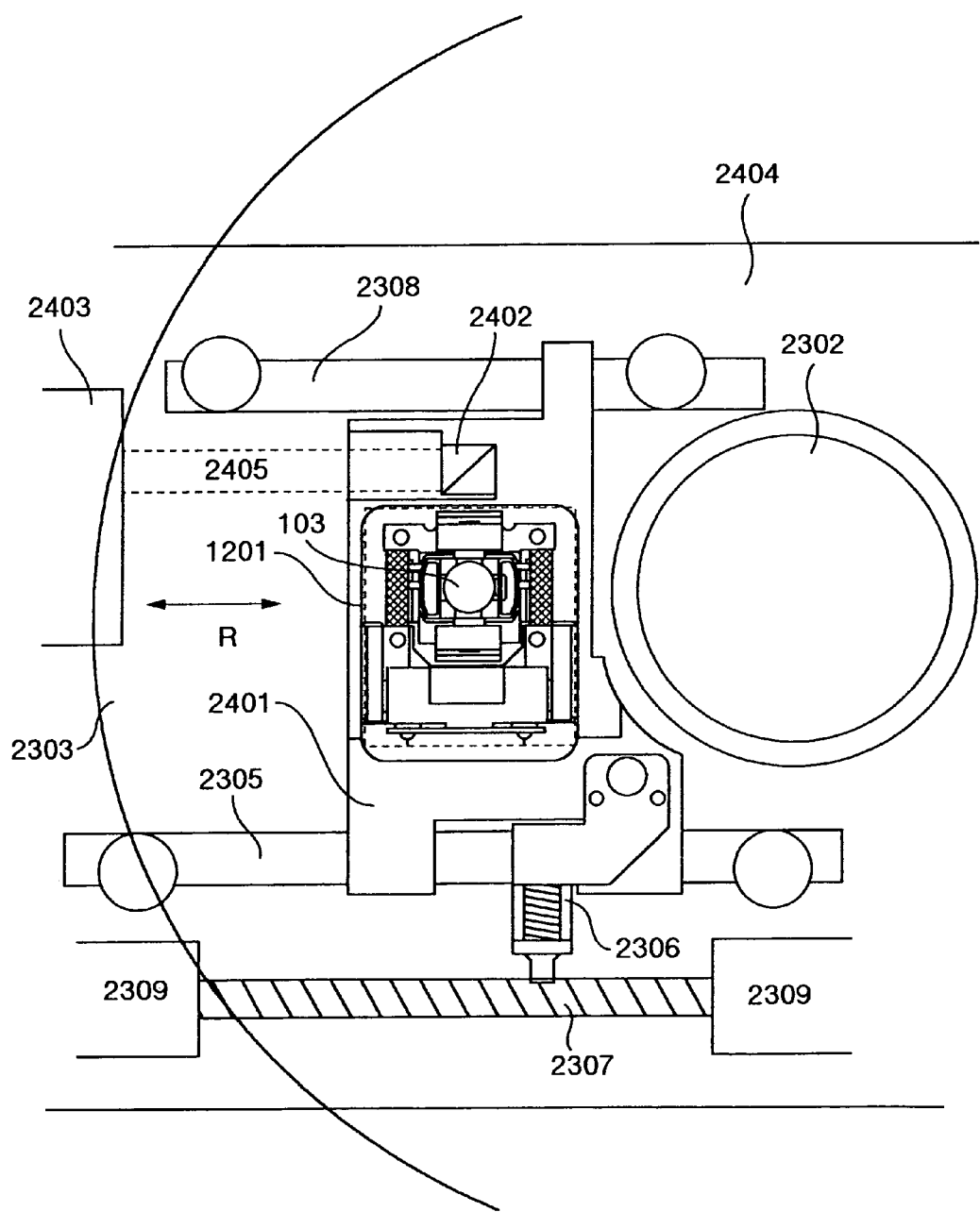
FIG. 24 is a view showing another embodiment of the optical disc apparatus mounting the operation sound restricting optical pickup thereon.

FIG. 24 shows an embodiment of an optical disc apparatus which is different from FIG. 23. Reference numeral 2401 denotes a casing. The unit base 117, the lens holder 106 supported to the unit base 117 via the suspension 112, the yoke 110 connected via the spring member 118, the magnet 109 and the like which are described above are arranged in the portion surrounded by the dotted line 1201, a mirror cube is arranged in an outer side of the portion surrounded by the dotted line 1201, and the casing 2401 is arranged in a lower surface of the optical disc 2303 which is chucked to the disc motor 2302 and rotates. Reference numeral 2403 denotes an optical system such as a laser light source (not shown), a collimate lens (not shown), a light detector (not shown) and the like. The optical system 2403 is fixed to a chassis 2404. A light beam 2405 outgoing from the optical system 2403 is curved at 90 degrees by the mirror cube 2402 mounted to the casing 2401, and enters into the objective lens 103 so as to be irradiated onto the optical disc 2303. The disc motor 2302 is fixed to the chassis 2404, the main shaft guide bar 2305 is inserted to one end of the casing 2401 and is connected to the feeding screw 2307 via the pressure application portion 2306, the sub shaft guide bar 2308 is held in another end in a state of being inserted, and these guide bars 2305 and 2308 are fixed to the chassis 2404 in accordance with a screwing or the like. The feed screw 2307 is driven by a feed motor 2309 such as a pulse motor or the like, whereby the casing 2401 moves all along a radial direction (a direction R in the drawing) of the optical disc 2303. In this case, a microphone for recording a voice from an external portion is arranged close to the constituting parts described above such as the casing 2401, the optical disc 2303 and the like, which are not illustrated in this drawing, and the constituting parts described above, an electric circuit for feeding signals to them so as to control, and the microphone mentioned above are mounted. In this drawing, there is shown the embodiment in the case of mounting the first operation sound restricting structure described with reference to FIGS. 1 to 13 to the portion surrounded by the dotted line 1201, however, it is possible to mount the second operation sound restricting structure described with reference to FIGS. 14 to 20, or the third operation sound restricting structure described with reference to FIGS. 21 to 22.

As mentioned above, the description is given of the structures of the respective embodiments in accordance with the present invention, however, a description will be given below of an effect obtained by the first operation sound restricting structure (FIGS. 1 to 13) in accordance with the present invention with reference to FIG. 25.

Figure 25:
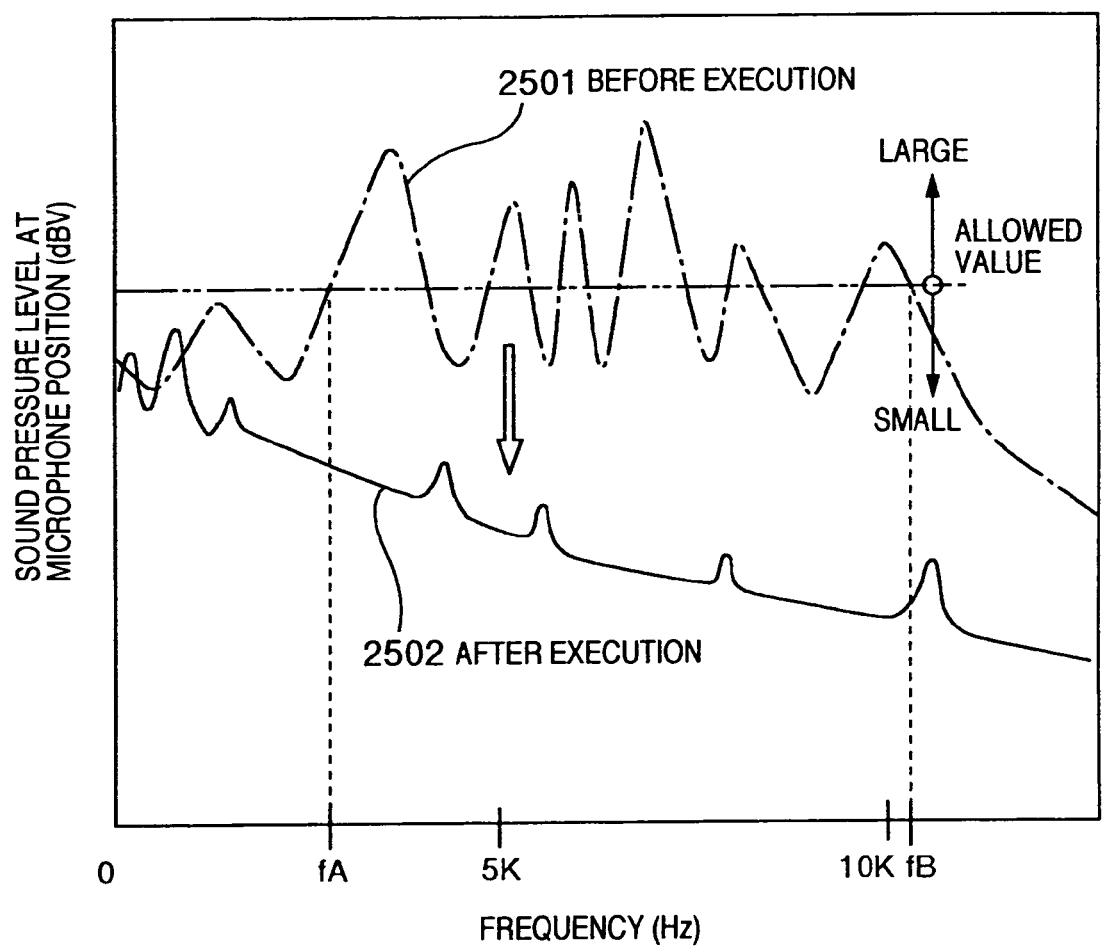
FIG. 25 is a view describing an effect obtained by the first operation sound restricting structure (FIGS. 1 to 13) in accordance with the present invention.

FIG. 25 shows a result obtained by measuring a frequency property of the operation sound generated in the case that the lens holder 106 operates, in the optical disc apparatus mounting the optical pickup of the first operation sound restricting structure in accordance with the present invention thereon. With setting a frequency (Hz) to a horizontal axis and setting a sound pressure level (dBV) to a vertical axis, a one-dot chain line portion 2501 in the drawing shows a state before executing the embodiment in accordance with the present invention, and a solid line portion 2502 shows a state after executing the embodiment in accordance with the present invention. In a band range 10 KHz which is important for the frequency property of the recording microphone and sensitive on audibility, a lot of peaks are generated between frequencies fA and fB as shown in a one-dot chain line 2501 and become over an allowed value before executing the embodiment in accordance with the present invention, however, the peaks generated between the frequencies fA and fB are widely reduced as shown in a solid line portion 2502 after executing the embodiment in accordance with the present invention, so that it is possible to restrict to be equal to or less than the allowed value. Further, although an illustration is omitted in this drawing, however, the sound pressure level in the band range between 10 KHz and 20 KHz can be also widely reduced. Simultaneously, after executing the present invention, the operation sound leaking out from the external portion of the optical disc apparatus is widely reduced in comparison with the case before executing the present invention, and it is possible to restrict to be equal to or less than the allowed value. As mentioned above, in accordance with the present invention, the sound pressure level reducing effect in the band range of 20 KHz remarkably appears, and it is confirmed that the sound pressure level in the frequency band range which is important for the frequency property of the recording microphone and sensitive on audibility can be reduced.

In this case, a description will be given below of a mechanism in which the sound pressure level at a time of operating can be reduced by the first operation sound restricting structure in accordance with the present invention, while comparing with the conventional structure shown in FIG. 32.

In the conventional structure shown in FIG. 32, in view of the structure, respective centers of a driving force applied to the lens holder 3202, a center of gravity and a reaction force of the suspension 3207 do not pass through an optical axis 3214 of the objective lens 3201, and even when the respective centers are made coincide with each other on design, displacement of the respective centers is actually generated due to a manufacturing dispersion, and a rotational vibration component energized at a time when the lens holder 3202 is driven, is easily output. On the contrary, in accordance with the present invention, as shown in FIG. 1, the focus coil 107 mounted to the lens holder 106, the tracking coil 108, the magnet 109 and the opposing surfaces of the yoke 110 are respectively arranged substantially point symmetrical positions with respect to the optical axis 111 of the objective lens 103, and the mounting position of the suspension 112 is set to substantially a center of the objective lens 103. In accordance with this structure, all of respective centers of a driving force applied to the lens holder 106, a center of gravity and a reaction force of the suspension 112 pass through the optical axis 111 of the objective lens 103, and a displacement of the respective centers is hard to be generated even in the case that an actual manufacturing dispersion exists. Accordingly, when the lens holder 106 is driven due to the operation of the magnetic field generated by the electric current application to the focus coil 107 and the tracking coil 108, the magnet 109 and the yoke 110, the rotational vibration component energized by the lens holder 106 is hard to be output, and it is possible to reduce the operation sound generated by the rotational vibration component in comparison with the conventional structure shown in FIG. 32.

Figure 26:
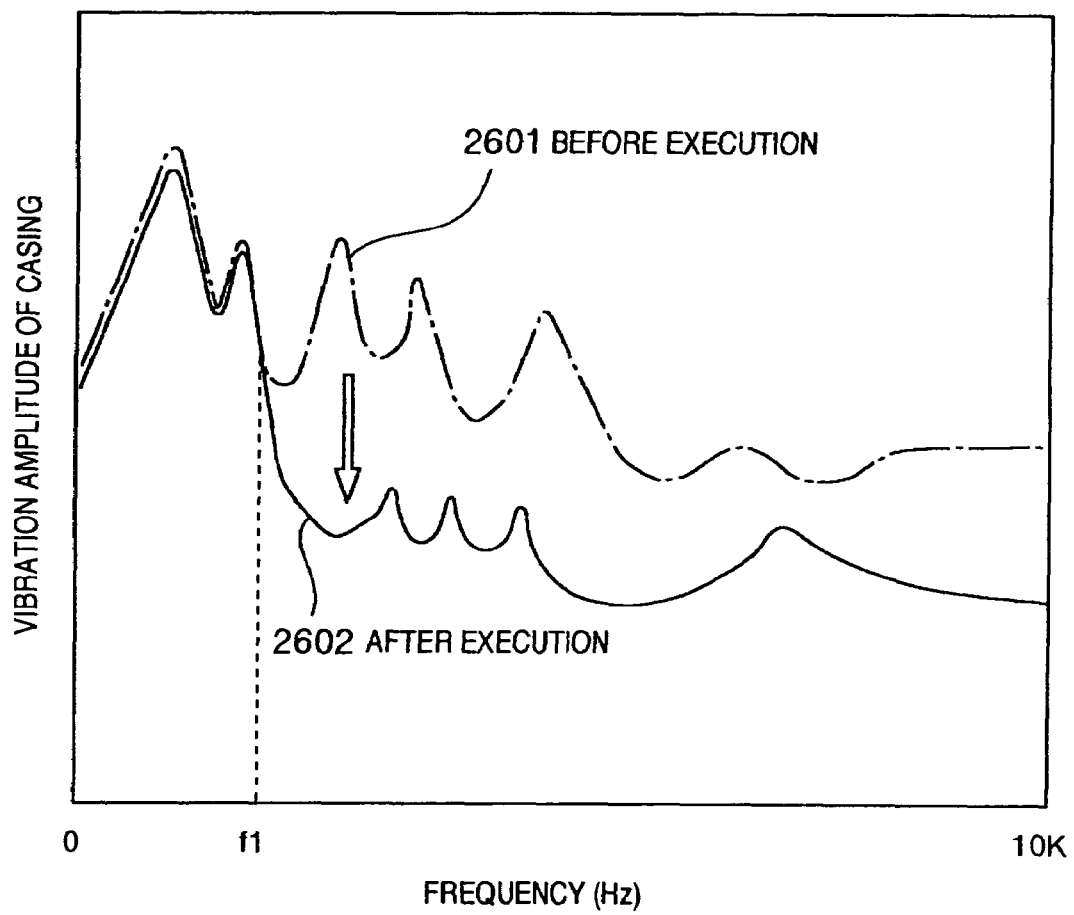
FIG. 26 is a view showing an embodiment analyzing a vibration amplitude generated from a casing 120.

In the conventional structure shown in FIG. 32, the yoke 3206 and the casing 3212 are directly connected via the adhesive agent 3213, and in view of the structure, specific frequencies of the yoke 3206 and the casing 3212 are comparatively close to each other. Accordingly, when the vibration is energized at the specific frequency of the yoke 3206 by the reaction force generated at a time when the lens holder 3202 is driven, the vibration is transmitted to the casing 3212 and the vibration is energized at the specific frequency of the casing 3212. The yoke 3206 and the casing 3212 generate a coupling of vibration by passing through the focus and tracking servo control system loop, and a whole vibration of the optical pickup is amplified. On the contrary, in accordance with the present invention, mainly as shown in FIGS. 1 to 3, the structure is made such that the yoke 110 and the unit base 117 are connected via the spring member 118 at least having a deformation freedom in the direction of the optical axis 111 of the objective lens 103, and the unit base 117 is mounted to the casing 120. In this case, in the vibration system comprising the magnet 109, the yoke 110 and the spring member 118, when the primary specific frequency of the objective lens 103 in the direction of the optical axis 111 is expressed as f1 and the minimum order specific frequency of the casing 120 is expressed as F1, an upper limit value of f1 mentioned above is set to be equal to or less than $1/\sqrt{2}$ times of F1 mentioned above, and although not being illustrated, when expressing the primary specific frequency of the damping leg supporting the chassis to which the optical pickup in accordance with the present invention is mounted in the direction of the optical axis 111 to F2, it is set so that a lower limit value of f1 mentioned above is equal to or more than $\sqrt{2}$ time of F2 mentioned above. Accordingly, it is possible to make the specific frequency of the yoke 110 sufficiently smaller than the specific frequency of the casing 120 so as to avoid mutual vibration coupling, it is possible to reduce the reaction force generated at a time when the lens holder 106 is driven by the spring member 118 so as to reduce the vibration component transmitted to the casing 120, and it is possible to avoid an interference with the vibration component applied to the chassis from the external portion via the vibration leg. Further, as shown in FIGS. 12 and 13, the casing 120 is made in a closed structure surrounding the unit base 117, the lens holder 106 supported to the unit base 117 via the suspension 112, and the space in which the yoke 110 and the magnet 109 connected via the spring member 118 are arranged, except the surface opposing to the disc-like recording medium 104, and is formed by an aluminum die casting member, a zinc die casting member, the aluminum and zinc mixed die casting member or the like, whereby the structure of the casing 120 itself is made in a high rigidity structure in which bending and twisting vibration are not coupled. FIG. 26 shows an embodiment obtained by analyzing a vibration amplitude generated from the casing 120, in which a frequency (under 10 KHz) is set to a horizontal axis, a vibration amplitude of the casing 120 is set to a vertical axis, a one-dot chain line 2601 (FIG. 25) before executing the present invention, and a solid line 2602 shows a state after executing the present invention. In accordance with this drawing, it is known that the vibration amplitude can be widely reduced from one-dot chain line 2601 to the solid line 2602 in the frequency band range 10 KHz which is important for the frequency property of the recording microphone and sensitive on audibility. In accordance with the structure mentioned above, it is possible to reduce the operation sound due to the vibration component generated from a whole of the casing 120 at a time of passing through the loop of the focus and tracking servo control system in comparison with the conventional structure.

Figure 27A:
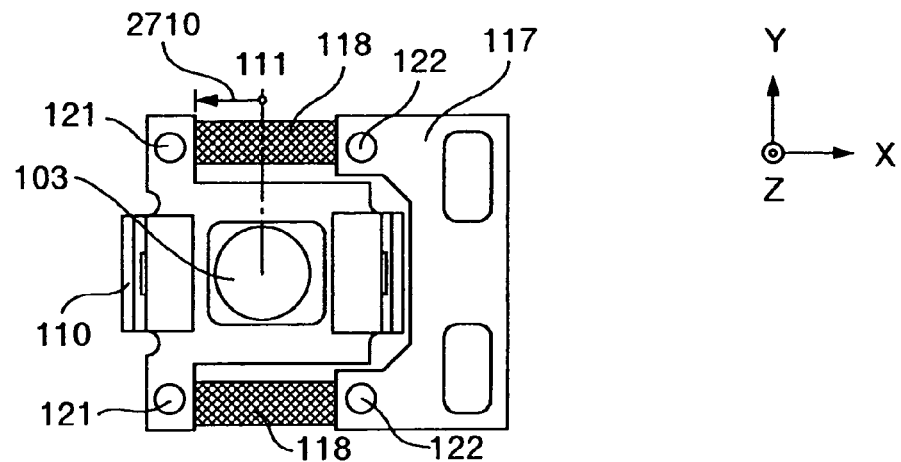
FIGS. 27A to 27C are views showing a connecting position between the yoke 110 and the spring member 118.
Figure 27B:
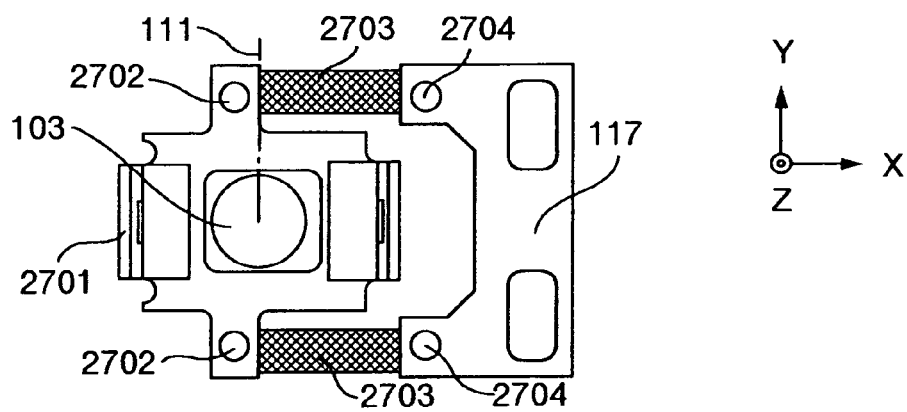
Figure 27C:
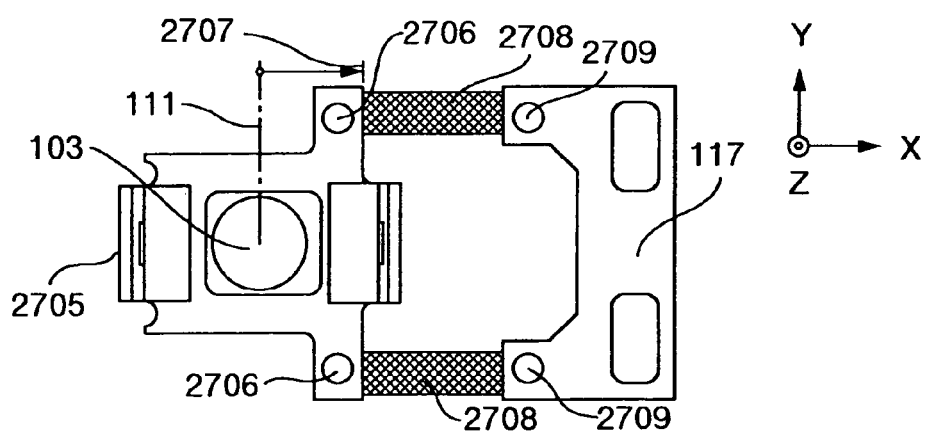

In this case, in the case of only connecting the yoke 110 to the unit base 117 via the spring member 118, it is possible to reduce the operation sound due to the vibration component generated from a whole of the casing 120 as mentioned above, but it is hard to effectively reduce the operation sound due to the vibration component of the yoke 110 itself. Accordingly, in accordance with the present invention, the position forward (in the direction −X) apart from the optical axis 111 of the objective lens 103 with respect to the longitudinal direction of the spring member 118 is set to the connection position between the yoke 110 and the spring member 118. In accordance with the structure mentioned above, it is possible to most effectively reduce the operation sound due to the vibration component generated from the yoke 110 itself arranged in the inner portion of the casing 120. This matter will be described below with reference to FIGS. 27 to 29. FIG. 27 described a case in which the connection position 121 between the yoke 110 and the spring member 118 is different among (a) to (c). In (a), the yoke 110 and the spring member 118 are connected at the connection position forward (in the direction −X) apart from the optical axis of the objective lens 103 with respect to the longitudinal direction (the direction X) of the spring member 118 (shown by an arrow 2710). On the contrary, in (b), a yoke 2701 and a spring member 2703 are connected at a connection position 2702 so as to substantially coincide with the optical axis 111 of the objective lens 103 with respect to a longitudinal direction (a direction X) of the spring member 2703. In (c), a yoke 2705 and a spring member 2708 are connected at a connection position 2706 backward (in a direction +X) apart (shown by an arrow 2707) from the optical axis 111 of the objective lens 103 with respect to a longitudinal direction (a direction X) of the spring member 2708. FIG. 28 shows examples in which a vibration response analysis of the yokes 110, 2701 and 2705 is executed in the respective cases (a) to (c) in FIG. 27, and shows a result of analysis in a direction Z, a direction X and a direction Y by setting a frequency to a horizontal axis and setting a vibration amplitude to a vertical axis. Further, FIG. 29 shows an example in which a vibration mode analysis is executed. At first, a description will be given of the direction Z. In a frequency f1, the vibration amplitude of (b) is largest, and the vibration amplitudes of (a) and (c) are the same level. In a frequency f2, the vibration amplitudes of (a), (b) and (c) are the same level, and in a frequency f3, the vibration amplitude of (c) is largest and the vibration amplitudes of (a) and (b) are the same level. This is because as shown in FIG. 29, in the case of (b) in the frequency f1, the yoke 2701 is largely affected by the vibration mode rotating around the axis Y in the drawing, and in the case of (c) in the frequency f3, the yoke 2705 and the unit base 117 are largely affected by the vibration modes mutually rotating at the inverse phases around the axis Y in the drawing. As a result, the vibration amplitude is smallest in the case of (a). Next, with respect to the direction X, in the frequency f1, the vibration amplitude of (b) is largest, and the vibration amplitudes of (a) and (c) are the same level, and between the frequency f2 and the frequency f3, the vibration amplitude of (c) is largest, and the vibration amplitudes of (a) and (b) are the same level. In the frequency f3, the vibration frequency of (c) is largest, and the vibration amplitudes of (a) and (b) are the same level. This is because the same vibration modes as the vibration modes described with respect to the direction Z mentioned above are affected. As a result, the vibration amplitude is smallest in the case of (a). Next, with respect to the direction Y, in a frequency f4, the vibration amplitudes of (a), (b) and (c) are the same level, between the frequency f2 and the frequency f3, the vibration amplitude of (b) is largest, and the vibration frequency of (a) is smallest. In a frequency f5, the vibration frequency of (c) is largest, and the vibration frequency of (a) is smallest. This is because in the case of (c) in the frequency f5, as shown in FIG. 29, the yoke 2705 is largely affected by the vibration mode rotating around the axis Z in the drawing. As a result, the vibration amplitude is smallest in the case of (a). As mentioned above, it is known that the vibration amplitude is smallest in the case of (a) in all of the directions X, Y and Z, and it corresponds to the structure in which the operation sound due to the vibration component generated from the yoke 110 itself is smallest. However, even in the case (b) and (c), it is possible to employ for a product in some cases.

Figure 31A:
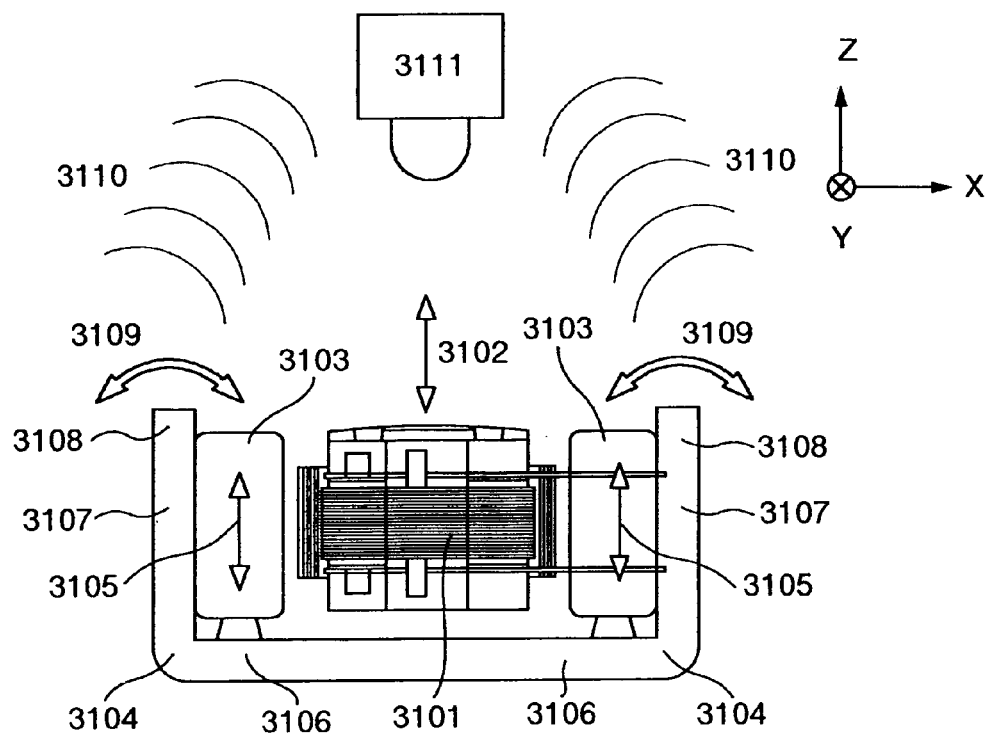
FIGS. 31A and 31B describing a mechanism restricting a sound pressure, in the second operation sound restricting structure.
Figure 31B:
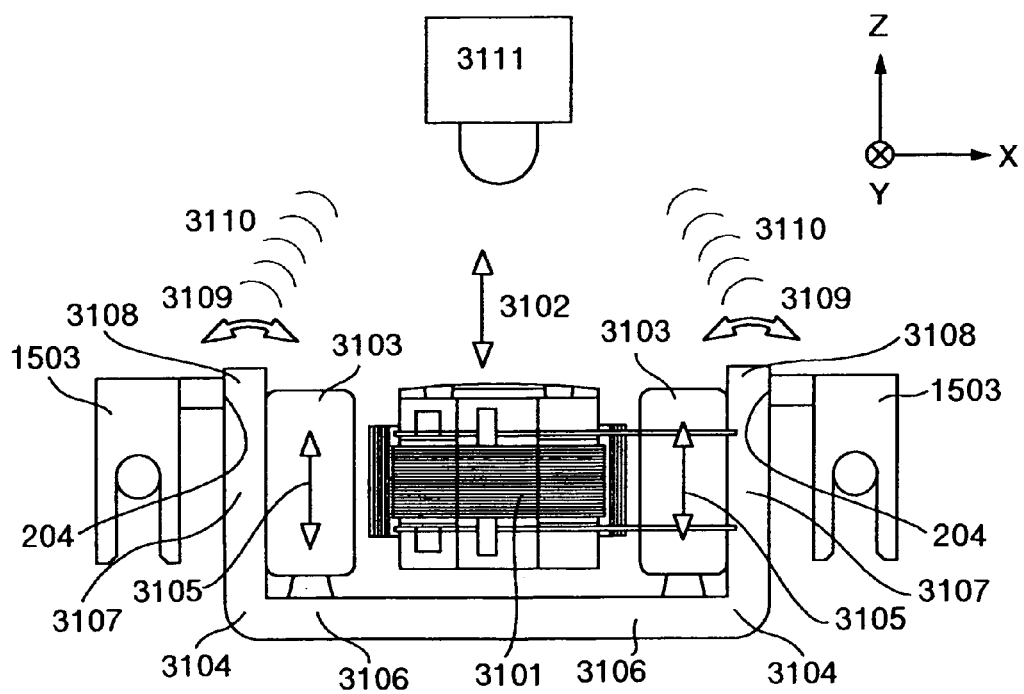

Next, a description will be given of effects obtained by the second operation sound restricting structure (FIGS. 14 to 20) in accordance with the present invention with reference to FIG. 30. FIG. 30 shows a result obtained by measuring a frequency characteristic of an operation sound generated in the case a movable portion including the objective lens 1402 is operated, in the optical disc apparatus mounting the second operation sound restricting structure thereon, at a position of the recording microphone. With setting a frequency (Hz) (100 to 20000 Hz) to a horizontal axis and setting a sound pressure level (dBA) to a vertical axis, a dotted line portion 3001 in FIG. 30 shows a state before executing the present invention, and a solid line portion 3002 shows a state after executing the second operation sound restricting structure in accordance with the present invention. Before executing the present invention, a peak of the sound pressure exists between the frequencies f1 and f2 and is over the allowed value, however, after executing the second operation sound restricting structure in accordance with the present invention, the peak of the sound pressure generated between the frequencies f1 and f2 is widely reduced and can be restricted to be equal to or less than the allowed value. A description will be given below of the mechanism with reference to FIG. 31. An upper state (A) of FIG. 31 shows the structure before executing the present invention, in which when a movable portion including a focus coil 3101 is operated in a focus direction (a direction Z) (an arrow 3102), a yoke 3104 is exposed to a reaction force (an arrow 3105) via a magnetic force applied from a magnet 3103. In this case, the yoke 3104 is constituted by a first yoke 3106 which is substantially in parallel to an optical disc (not shown) (in a direction X of this drawing) and has a predetermined thickness, and a second yoke 3107 which is bent substantially perpendicular to the first yoke 3106 (in a direction Z of this drawing) so that one end is connected to the first yoke 3106 and another end opposes to the optical disc (not shown), and has a predetermined thickness, however, in view of structure, a front end portion 3108 of the second yoke 3107 has a mode (shown by an arrow 3109) of easily rotating around an axis Y in the drawing. Due to an influence of this mode, the front end portion 3108 of the second yoke 3107 vibrates around the axis Y as shown by the arrow 3109, however, since there is no means for restricting this vibration, a vibration energy is hardly damped. When the movable portion continuously operates in accordance with a servo control, the vibration (the vibration around the axis Y shown by the arrow 3109) generated in the second yoke 3107 is amplified, and by extension, the vibration generated in the first yoke 3106 connected to the second yoke 3107 and the magnet 3103 is amplified by being affected by the vibration. When this state continues, the movable portion operates as a vibration body of a speaker and the yoke portion 3104 operates as a resonant disc, so that a remarkable operation sound 3110 having a peak in 20 KHz band range is generated. As a result, the operation sound mentioned above bursts into an external voice recording microphone 3111 arranged close thereto, and a reproduced sound quality is deteriorated.

Accordingly, in the case of providing with the vibration restricting member 1503 so that one end 1504 thereof is in contact with the front end portion 1505 of the second yoke 1502 due to application of the urging force from the direction X in this drawing as described with reference to FIGS. 14 and 15, when the movable portion including the focus coil 3101 operates (the arrow 3102) in the focus direction (the Z direction) as shown in a lower state (B) of FIG. 31, the second yoke 3107 is exposed to the reaction force (the arrow 3105), in the same manner as the upper stage (A). However, at this time, since the vibration restricting member 1503 is provided in the front end portion 3108 of the second yoke 3107 so as to be in contact in a state that the energizing force is applied from X direction thereto, it is possible to widely improve a rigidity around the axis Y of the drawing with respect to the second yoke 3107. As a result, even when the same vibration energy as that of the case of the upper stage (A) is applied, the vibration amplitude (shown by the arrow 3109) around the axis Y of the drawing with respect to the front end portion 3108 of the second yoke 3107 can be restricted in comparison with the case of the upper stage (A), so that the vibration energy of the yoke portion 3104 is reduced. Even when the movable portion serving as the vibration body is operated due to the operation, the vibration amplitude of the yoke portion 3104 serving as the resonant disc is reduced, so that the generation of the operation sound (shown by reference numeral 3110) is reduced. As a result, the operation sound bursting into the external voice recording microphone 3111 arranged close thereto is widely reduced, and the deterioration of the reproduced sound quality is lost. In the above description, the description is exemplified of the case of operating in the focus direction (the direction Z), however, the same operation is also obtained in the case of operating in the tracking direction (the direction Y), and the generation of the operation sound is reduced.

In the third operation sound restricting structure (FIGS. 21 and 22) in accordance with the present invention, the second operation sound restricting structure mentioned above is combined with the first operation sound restricting structure mentioned above, and it is possible to reduce the operation sound compared with the first operation sound restricting structure.

In this case, the spring member described above may employ an elastic member, a viscosity member and the like as far as it hardly transmits the vibration.

As mentioned above, in accordance with the present invention, in the optical pickup, it is possible to widely reduce the operation sound energized at a time when the lens holder is driven due to the operation of the magnetic field generated by the electric current application to the coil, the magnet and the yoke, in comparison with the conventional one. As a result, it is possible to provide the optical disc apparatus in which the operation generated sound is reduced.

It should be further understood by those skilled in the art that the foregoing description has been made on embodiments of the invention and that various changes and modifications may be made in the invention without departing from the spirit of the invention and the scope of the appended claims.

What is claimed is:

1. An optical pickup comprising:
a laser light source;
an objective lens focusing a light beam emitted from said laser light source;
a lens holder having said objective lens, focus coils and tracking coils;
magnets driving said focus coils and the tracking coils;
a magnet fixing member fixing said magnets;
a unit base supporting said lens holder; and
a casing holding said unit base, wherein one end of an elastic member is connected to said unit base, and the other end of said elastic member is connected to said magnet fixing member at point symmetrical positions on the basis of a center of said objective lens,
wherein one of said magnets driving the focus coil or the tracking coil, and a corresponding focus coil or tracking coil provided in said lens holder, are arranged at substantially point symmetrical positions on the basis of the center of said objective lens so as to face to another one of said magnets driving the other of the focus coil or the tracking coil, and a corresponding focus coil or tracking coil, and a connecting position between a suspension supporting said lens holder and said lens holder, is arranged at substantially point symmetrical positions on the basis of the center line of said focus coil or the tracking coil facing to each other.

2. An optical disc apparatus comprising:
an optical pickup including:
a laser light source;
an objective lens focusing a light beam emitted from said laser light source;
a lens holder having said objective lens, a focus coil and a tracking coil;
magnets driving said focus coil and the tracking coil;
a magnet fixing member fixing said magnets;
a unit base supporting said lens holder; and
a casing holding said unit base,
wherein one end of an elastic member is connected to said unit base, and the other end of said elastic member is connected to said magnet fixing member at point symmetrical positions on the basis of a center of said objective lens, and
wherein said magnet, and the focus coil or the tracking coil provided in said lens holder, are arranged at substantially point symmetrical positions on the basis of the center of said objective lens so as to face to the other magnet, and the focus coil or the tracking coil, and a connecting position between a suspension supporting said lens holder and said lens holder, is arranged at substantially point symmetrical positions on the basis of the center line of said focus coil or the tracking coil facing to each other;
an optical pickup feeding mechanism moving said optical pickup in a radial direction of a disc-like recording medium;
a disc motor for attaching said disc-like recording medium thereto and rotating said disc-like medium;
a chassis mounting said optical pickup, said optical pickup feeding mechanism, and said disc motor; and
an electric circuit having a signal processing system and a control system.

3. An optical pickup comprising:
a laser light source;
an objective lens focusing a light beam emitted from said laser light source on an information recording medium;
a lens holder having said objective lens, a focus coil, and a tracking coil;
magnets driving said focus coil and the tracking coil;
a magnet fixing member fixing said magnets;
a unit base supporting said lens holder;
a casing holding said unit base; and
the optical pickup being used in an optical disc apparatus, wherein one end of an elastic member is connected to said unit base, and the other end of said elastic member is connected to said magnet fixing member at an opposite position to one end of said elastic member with respect to an axis passing through a center of rotation of said information recording medium and an optical axis of said objective lens, wherein said magnets, the focus coil, and the tracking coil provided in said lens holder are arranged at line symmetrical positions with respect to the axis passing through the center of rotation of said information recording medium, and the optical axis of said objective lens, and a connecting position between a suspension supporting said lens holder and said lens holder, is arranged on said axis.

4. An optical disc apparatus comprising:

an optical pickup including:

a laser light source;

an objective lens focusing a light beam emitted from said laser light source on an information recording medium;

a lens holder having said objective lens, a focus coil, and a tracking coil;

magnets driving said focus coil and the tracking coil;

a magnet fixing member fixing said magnets;

a unit base supporting said lens holder;

a casing holding said unit base; and wherein one end of an elastic member is connected to said unit base, and the other end of said elastic member is connected to said magnet fixing member at an opposite position to one end of said elastic member with respect to an axis passing through a center of rotation of said information recording medium and an optical axis of said objective lens;

wherein said magnets, the focus coil and the tracking coil provided in said lens holder are arranged at line symmetrical positions with respect to the axis passing through the center of rotation of said information recording medium and the optical axis of said objective lens, and a connecting position between a suspension supporting said lens holder and said lens holder is arranged on said axis;

an optical pickup feeding mechanism moving said optical pickup in a radial direction of said information recording medium;

a disc motor for attaching said information recording medium thereto and rotating said information recording medium;

a chassis mounting said optical pickup, said optical pickup feeding mechanism and said disc motor; and an electric circuit having a signal processing system and a control system.

* * * * *